United States Patent
Kaufman et al.

(10) Patent No.: US 8,265,864 B1
(45) Date of Patent: Sep. 11, 2012

(54) METHOD OF PROVIDING GEOGRAPHIC INFORMATION FOR A NAVIGATION SYSTEM

(75) Inventors: Michael L. Kaufman, Chicago, IL (US); James M. Herbst, Chicago, IL (US)

(73) Assignee: Navteq B.V., Veldhoven (NL)

( * ) Notice: Subject to any disclaimer, the term of this patent is extended or adjusted under 35 U.S.C. 154(b) by 803 days.

(21) Appl. No.: 11/224,480

(22) Filed: Sep. 12, 2005

(51) Int. Cl.
*G01C 21/00* (2006.01)

(52) U.S. Cl. ... 701/408; 701/432; 701/418; 340/995.14; 340/995.16; 345/156; 345/172

(58) Field of Classification Search .................. 701/200, 701/206, 208, 209, 211, 212; 340/990, 995.1, 340/995.11, 995.12, 995.14, 995.15, 995.19, 340/995.24, 995.26; 345/156, 172
See application file for complete search history.

(56) References Cited

U.S. PATENT DOCUMENTS

| | | | |
|---|---|---|---|
| 4,660,037 A | 4/1987 | Nakamura | 340/990 |
| 4,689,747 A | 8/1987 | Kurose et al. | |
| 4,737,927 A | 4/1988 | Hanabusa et al. | |
| 4,972,319 A | 11/1990 | Delorme | |
| 5,032,989 A * | 7/1991 | Tornetta | 705/313 |
| 5,682,525 A * | 10/1997 | Bouve et al. | 1/1 |
| 5,844,570 A * | 12/1998 | Curtright et al. | 345/629 |
| 6,092,076 A | 7/2000 | McDonough et al. | 707/102 |
| 6,182,010 B1 * | 1/2001 | Berstis | 701/211 |
| 6,282,362 B1 * | 8/2001 | Murphy et al. | 386/46 |
| 6,504,571 B1 * | 1/2003 | Narayanaswami et al. | 348/231.99 |
| 6,990,534 B2 * | 1/2006 | Mikhailov et al. | 709/250 |
| 7,233,942 B2 * | 6/2007 | Nye | 1/1 |
| 2004/0051695 A1 * | 3/2004 | Yamamoto et al. | 345/156 |
| 2005/0248527 A1 * | 11/2005 | Scott | 345/156 |
| 2006/0031010 A1 * | 2/2006 | Friedrich | 701/211 |

\* cited by examiner

*Primary Examiner* — Redhwan K Mawari

(74) *Attorney, Agent, or Firm* — Jon D. Sutter; Frank J. Kozak; Adil M. Musabji

(57) ABSTRACT

A method of providing geographic information for a navigation system comprises obtaining a request for a geographic region and accessing geographic data corresponding to the geographic region from a geographic database. The method also comprises providing a plurality of first map images generated from the geographic data. Each of the first map images represents a unique portion of the geographic region. When the first map images are displayed together, they provide a first map depicting the geographic region.

7 Claims, 18 Drawing Sheets

METHOD OF PROVIDING GEOGRAPHIC INFORMATION FOR A NAVIGATION SYSTEM

BACKGROUND OF THE INVENTION

The present invention relates to a method for providing geographic information, and more particularly to a method of providing geographic information for display on a computing platform, such as a navigation system.

Vehicle navigation systems are available that provide end users with various navigation-related functions and features. For example, some navigation systems are able to determine an optimum route to travel along a road network from an origin location to a destination location in a geographic region. Using input from the end user, and optionally from equipment that can determine the end user's location (such as a GPS system), the navigation system can examine various potential routes between the origin and destination locations to determine the optimum route. The navigation system may then provide the end user with information about the optimum route in the form of guidance that identifies the driving maneuvers required to be taken by the end user to travel from the origin to the destination location. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as the positions of the roads, speed limits along portions of roads, address ranges along the road portions, turn restrictions at intersections of roads, direction restrictions, such as one-way streets, and so on. Additionally, the geographic data may include points of interest, such as restaurants, hotels, airports, gas stations, stadiums, police stations, and so on.

There are various navigation systems that graphically display maps of geographic areas. For example, some vehicle navigation systems include a display screen upon which a map of a geographic area can be displayed graphically. In addition, by using appropriate software applications, maps can also be displayed on general purpose computing platforms, such as personal computers and personal digital assistants.

Some navigation systems and applications that display graphical maps include features that allow a user to interact with the map. Various types of user interaction may be supported. Among these types of user interaction is the ability to zoom in or out. When a user zooms in on a map, a sub-portion of the originally displayed map is selected. The user may operate a pointing device for this purpose. Then, a new map is graphically displayed. The new map corresponds to the geographic area of the selected sub-portion of the originally displayed map. The new map is at a larger scale than the originally displayed map so that new map fills the same area on the display screen of the computing device on which the originally displayed map had been shown.

Although navigation systems provide many important features, there continues to be room for new features and improvements. One area in which there is room for improvement relates to providing geographic information to a computing platform having a user interface that provides only limited entry of information. Additionally, there is room for improvement for providing geographic information that may be stored on the computing platform and readily provided for display without strenuous processing requirements.

Accordingly, it would be beneficial to have a way for providing geographic information to a computing platform having a user interface that provides only limited entry of information. Additionally, it would be beneficial to have a way for providing geographic information that may be stored on the computing platform and readily displayed without strenuous processing requirements.

SUMMARY OF THE INVENTION

To address these and other objectives, the present invention comprises a method of providing geographic information for a navigation system. The method obtains a request for a geographic region and accesses geographic data corresponding to the geographic region from a geographic database. The method provides a plurality of first map images generated from the geographic data. Each of the first map images represents a portion of the geographic region. When the first map images are displayed together, the first map images provide a first map depicting the geographic region. The method further comprises providing a plurality of zoom-in map images for each of the first map images. When the zoom-in map images are displayed, the zoom-in map images provide a zoom-in map having a larger scale than a scale of the first map.

Another aspect of the present invention is a method of providing geographic information for display on a computing platform. The method provides a plurality of first map images and a plurality of zoom-in map images for each of the first map images. The first map images depict a map of a portion of a geographic region. When the first map images are displayed together, the first map images provide a first map of the geographic region at a first scale. The zoom-in map images when displayed together provide a zoom-in map of the portion of the geographic region depicted by the respective first map image. The zoom-in map has a larger scale than the first scale.

A further aspect of the present invention is a method of providing geographic information for display on a computing platform. The method creates an original map image illustrating an original map of a geographic region. The original map has an original scale. The method divides the original map image into a plurality of first map images. Each of the first map images depicts a portion of the geographic region. When the first map images are displayed together, the first map images together provide the original map of the geographic region. For each of the first map images, the method creates a zoom-in map image of the portion of the geographic region depicted by the first map image. The zoom-in map image shows the portion of the geographic region at a larger scale than the original scale.

BRIEF DESCRIPTION OF THE DRAWINGS

An exemplary embodiment of the present invention is described herein with reference to the following drawings.

DETAILED DESCRIPTION OF THE PRESENTLY PREFERRED EMBODIMENTS

I. Computing Platform

Figure 1:
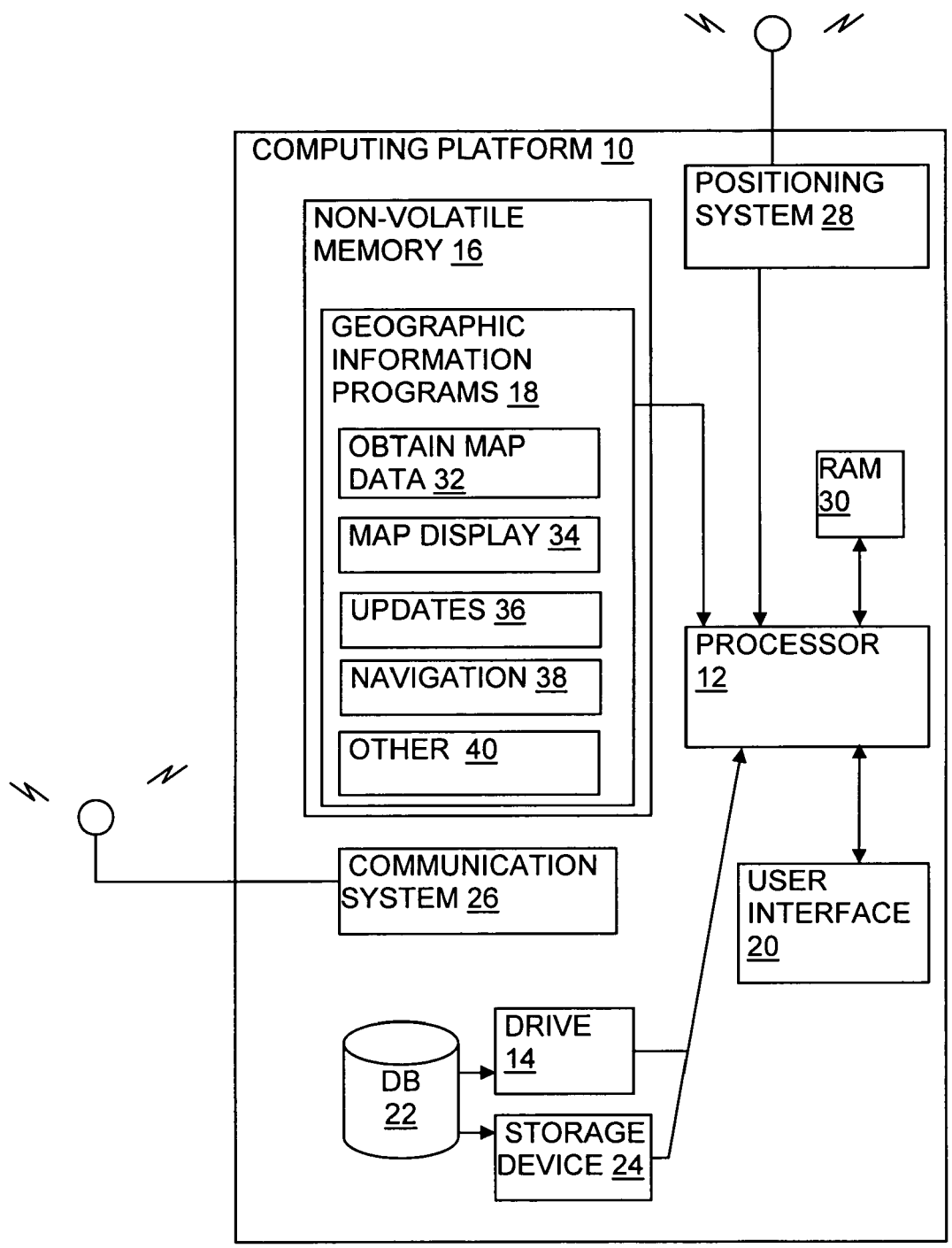
FIG. 1 is a block diagram of a computing platform capable of providing geographic information features, according to an exemplary embodiment.

FIG. 1 is a block diagram of a computing platform 10, such as a portable digital media player, a personal digital assistant (PDA), mobile telephone, vehicle navigation system, personal navigation system or any other computer, according to an exemplary embodiment. The computing platform 10 is a combination of hardware and software components. In one embodiment, the computing platform 10 includes a processor 12, a drive 14 connected to the processor 12, and a non-volatile memory storage device 16 for storing geographic information software programs 18 and possibly other information.

The computing platform 10 also includes a user interface 20 that allows the end user to input information into the computing platform 10 and obtain information from the computing platform 10. The input information may include a request for geographic information features and functions of the computing platform 10. To provide geographic information features and functions, the computing platform 10 uses a geographic database 22 stored on a storage medium 24. In one embodiment, the storage medium 24 is installed in the drive 14 so that the geographic database 22 can be read and used by the computing platform 10. In one embodiment, the geographic database 22 may be a geographic database published by NAVTEQ North America, LLC of Chicago, Ill. The storage medium 24 and the geographic database 22 do not have to be physically provided at the location of the computing platform 10. In alternative embodiments, the storage medium 24, upon which some or the entire geographic database 22 is stored, may be located remotely from the rest of the computing platform 10 and portions of the geographic data provided via a communications system 26, as needed. In another embodiment, the computing platform 10 includes a hard disk drive that receives and stores some or the entire geographic database 22.

The computing platform 10 may also include a positioning system 28. The positioning system 28 may utilize GPS-type technology, a dead reckoning-type system, or combinations of these or other systems, all of which are known in the art. The positioning system 28 outputs a signal to the processor 12. The geographic information application software programs 18 that run on the processor 12 use the signal from the positioning system 28 to determine the location, direction, orientation, etc., of the computing platform 10.

In one exemplary type of system, the geographic information application software programs 18 load from the non-volatile memory storage device 16 into a random access memory (RAM) 30 associated with the processor 12. The processor 12 also receives input from the user interface 20. The computing platform 10 uses the geographic database 22 stored on the storage medium 24, possibly in conjunction with the outputs from the positioning system 28 and the communications system 26, to provide various geographic information features and functions. The geographic information application software programs 18 may include separate applications (or subprograms) that provide the various geographic information features and functions. The geographic information functions and features may include obtain map data 32, map display 34, updates feature 36 (wherein geographic data is obtained to update a geographic database), and navigation feature 38 (wherein navigation-related features, such route calculation (wherein a route from an origin to a destination is determined) and route guidance (wherein detailed directions are provided for reaching a desired destination are provided). Other functions and programming 40 may be included in the computing platform 10, such as positioning (e.g., map matching). The geographic information application software programs 18 may be written in a suitable computer programming language such as C, although other programming languages, such as C++ or Java, are also suitable. All of the components described above may be conventional (or other than conventional) and the manufacture and use of these components are known to those of skill in the art.

Figure 2:
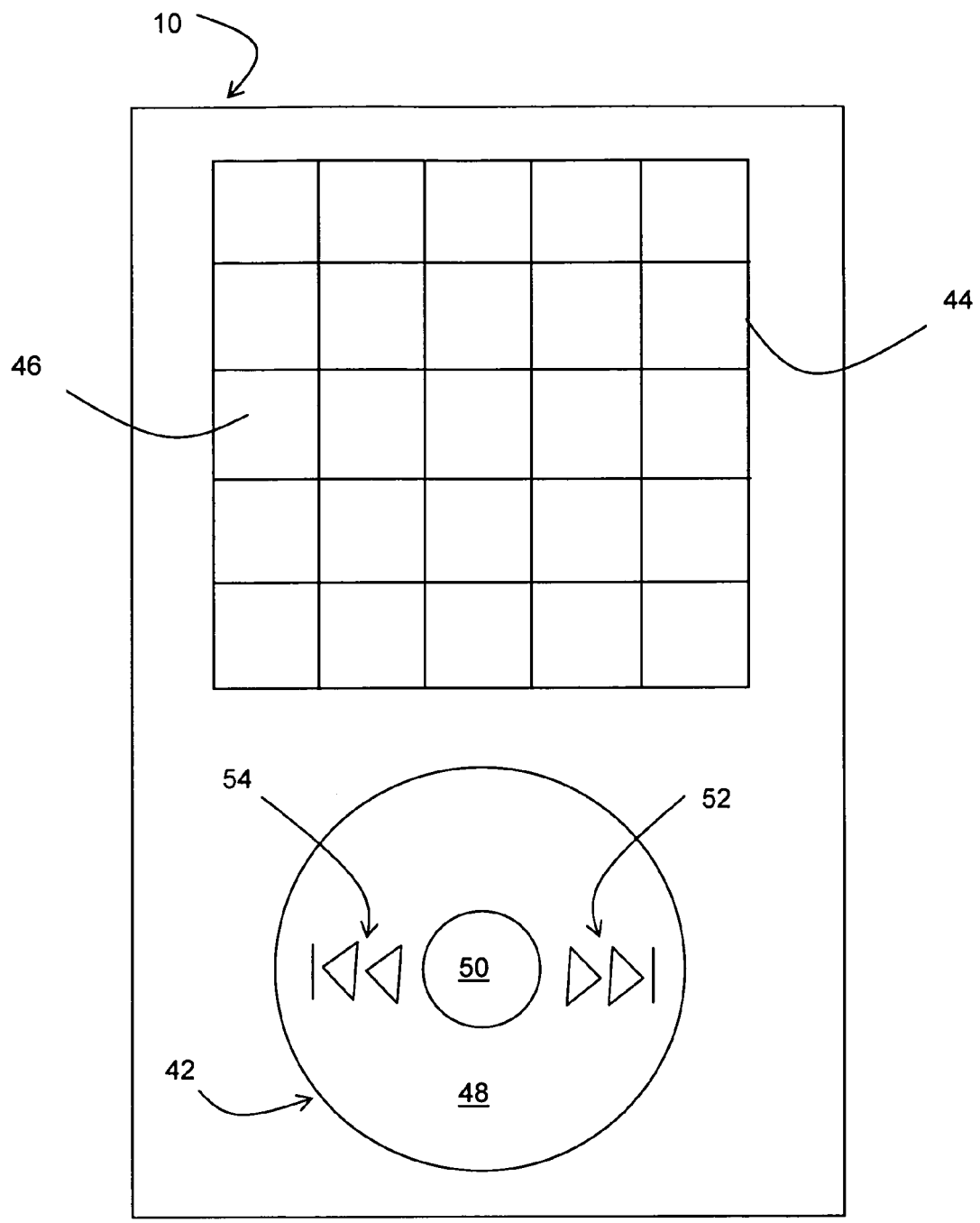
FIG. 2 is a diagram of an interface of the computing platform of FIG. 1, according to an exemplary embodiment.

FIG. 2 illustrates an exemplary embodiment of the computing platform 10. The computing platform 10 is a digital media player, such as an iPod Photo™. The computing platform 10 includes a click wheel interface 42 and LCD display screen 44. In one embodiment, the display screen 44 comprises twenty-five separate windows 46, and in alternate embodiments the display screen comprises any number of windows. Each window 46 may display a separate image or the entire display 44 may display a single image. The click wheel interface 42 includes a wheel portion 48 and a center button 50. An end user operates the click wheel interface 42 and screen 44 to implement various features of the computing platform 10. In one embodiment, the end user manipulates the click wheel to select a desired feature from a menu of options displayed on the screen 44. For example, the end user moves his or her finger in a clockwise direction around the wheel portion 48 of the click wheel interface 42 to move a highlight on a menu of selections, and the end user presses the center button 50 to select the highlighted menu selection. Additionally, the end user may use a next/fast-forward button 52 and previous/rewind button 54 to move the highlight.

II. Geographic Database

Figure 3:
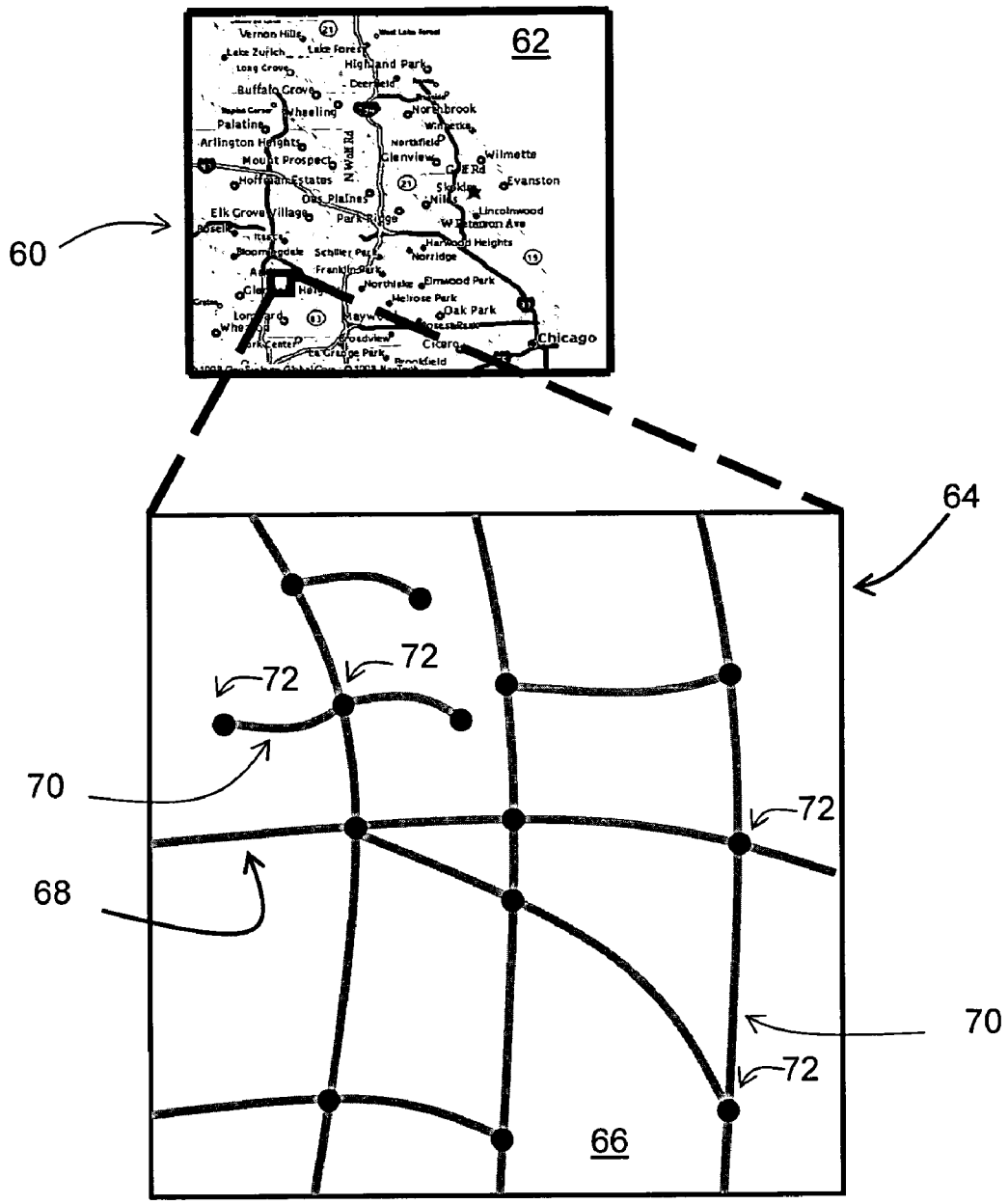
FIG. 3 shows a map of a geographic region.

FIG. 3 shows a map 60 of a geographic region 62. The geographic region 62 may correspond to a metropolitan or rural area, a state, a country, or combinations thereof, or any other area. Located in the geographic region 62 are physical geographic features, such as roads, points of interest (including businesses, facilities, etc.), lakes, rivers, railroads, municipalities, etc.

FIG. 3 also includes an enlarged map 64 of a portion 66 of the geographic region 62. The enlarged map 64 illustrates part of the road network 68 in the geographic region 62. The road network 68 includes, among other things, roads and intersections located in the geographic region 62. As shown in the portion 66, each road in the geographic region 62 is composed of one or more road segments 70. A road segment 70 represents a portion of the road. Each road segment 70 is shown to have associated with it two nodes 72; one node represents the point at one end of the road segment and the other node represents the point at the other end of the road segment. The node at either end of a road segment may correspond to a location at which the road meets another road, i.e., an intersection, or where the road dead-ends.

Figure 4:
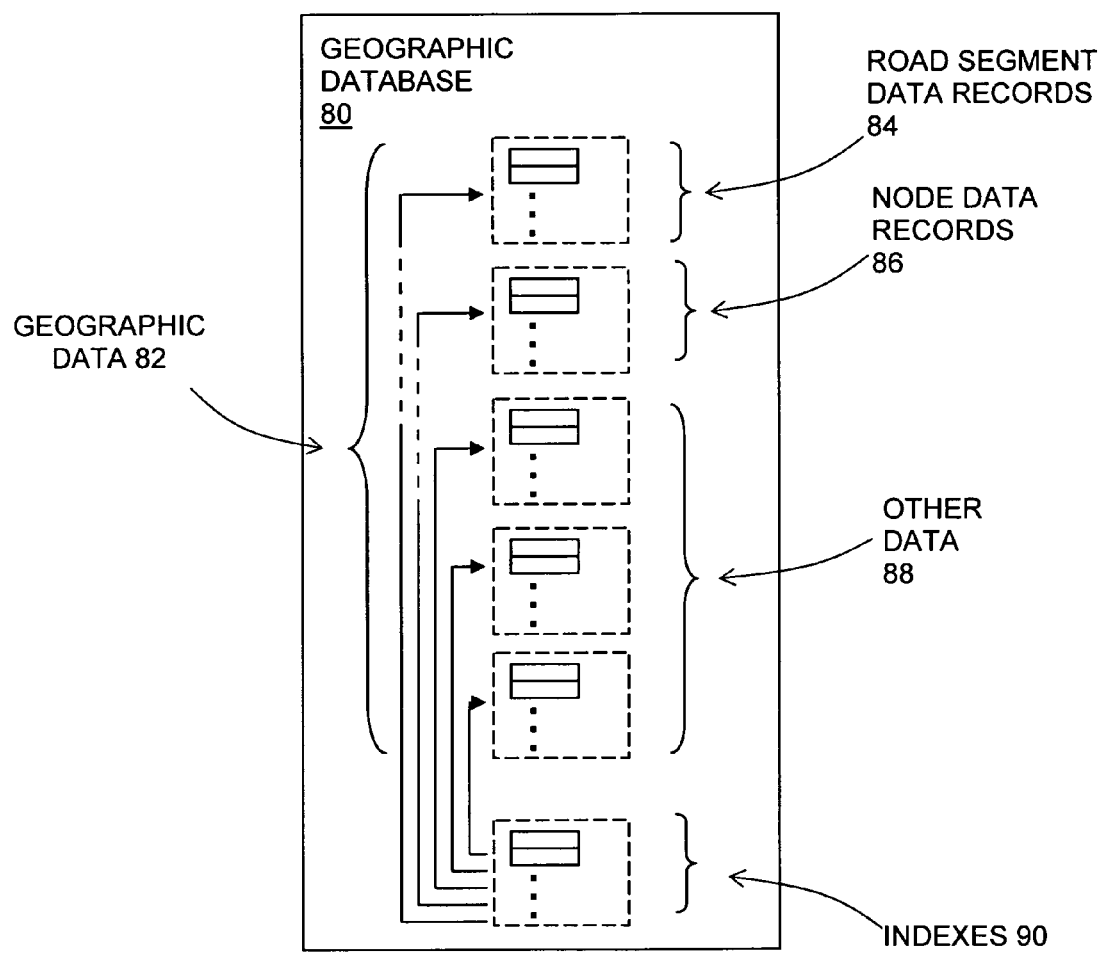
FIG. 4 is a block diagram of a geographic database that represents the geographic region of FIG. 3.

Referring to FIG. 4, a geographic database 80 contains data 82 that represents some of the physical geographic features in the geographic region (62 in FIG. 3). The data 82 contained in the geographic database 80 includes data that represent the road network 68. In the embodiment of FIG. 4, the geographic database 80 that represents the geographic region 62 contains at least one database record 84 (also referred to as "entity" or "entry") for each road segment 70 in the geographic region 62 in FIG. 3. The road segment record 84 may include a segment ID by which the data record can be identified in the geographic database 80. Each road segment data record 84 has associated with it information (such as "attributes", "fields", etc.) that describes features of the represented road segment. The road segment data record 84 may include data that indicate the restrictions, if any, on the direction of vehicular travel permitted on the represented road segment, data indicating a speed limit or speed category (i.e., the maximum permitted vehicular speed of travel) on the represented road segment, data indicating whether the represented road segment is part of a controlled access road (such as an expressway), a ramp to a controlled access road, a bridge, a tunnel, a toll road, a ferry, and so on. The road segment data record 84 also includes data providing the geographic coordinates (e.g., the latitude and longitude) of the endpoints of the represented road segment and data providing the shape of the road segment. In one embodiment, the endpoint data are references to the node data records 86 that represent the nodes corresponding to the endpoints of the represented road segment. The road segment data record 84 may also include or be associated with other data that refer to various other attributes of the represented road segment. The various attributes associated with a road segment may be included in a single road segment record, or may be included in more than one type of record which are cross-referenced to each other. For example, the road segment data record 84 may include data identifying what turn restrictions exist at each of the nodes which correspond to intersections at the ends of the road portion represented by the road segment, the name or names by which the represented road segment is known, the street address ranges along the represented road segment, and so on.

The geographic database 80 that represents the geographic region 62 also includes a database record 86 (or "entity" or "entry") for each node 72 in the geographic region 62. (The terms "nodes" and "segments" represent only one terminology for describing these physical geographic features and other terminology for describing these features is intended to be encompassed within the scope of these concepts). Each of the node data records 86 may have associated information (such as "attributes", "fields", etc.) that allows identification of the road segment(s) that connect to it and/or its geographic position (e.g., its latitude and longitude coordinates).

The geographic database 80 may also include other kinds of data 88. The other kinds of data 88 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. Each point of interest has a unique physical location and each of the locations can be identified by its two dimensional (or three dimensional) geographic coordinates, (i.e., latitude, longitude, and optionally altitude). Additionally, the locations may correspond to one of the nodes or may correspond to a point along a road segment. The geographic database 80 may also include images of geographic features. For example, the images may be digital photographic images of portions of road segments, intersections and points of interest. The geographic database 80 also includes indexes 90. The indexes 90 may include various types of indexes that relate the different types of data to each other or that relate to other aspects of the data contained in the geographic database 80.

III. System for Providing Geographic Information

Figure 5:
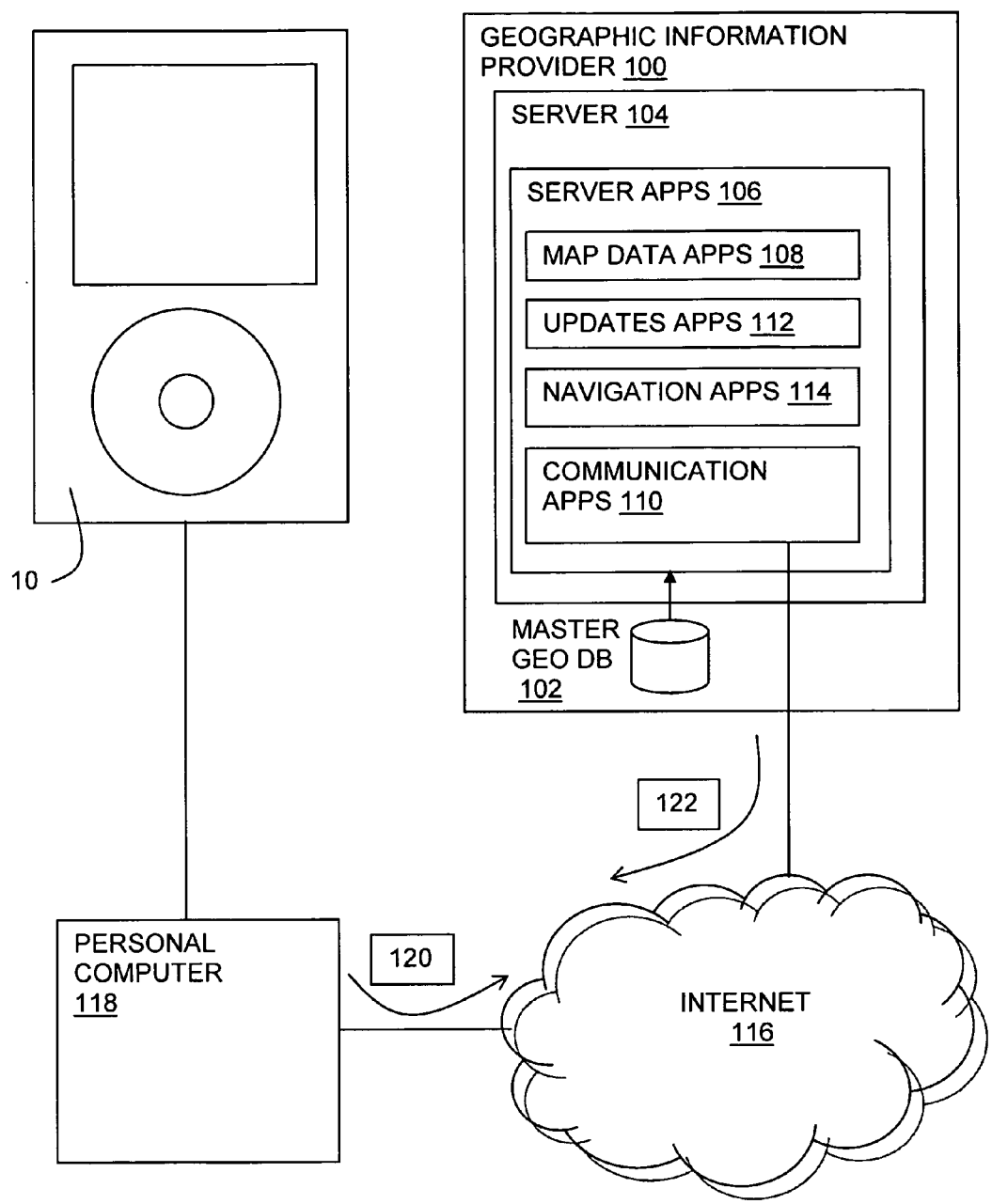
FIG. 5 is a block diagram of a system for providing geographic information.

FIG. 5 illustrates an exemplary embodiment of a system for providing geographic information for use with the computing platform 10. A geographic information provider 100 maintains a master geographic database 102. The master geographic database 102 contains an up-to-date data set provided by geographic researchers. The master geographic database 102 may be stored on one or more hard drive(s) or other storage media. In one embodiment, the master geographic database may maintain several versions of datasets to support different formats of various end user computing platforms. Additionally, the master geographic database 102 may include a revision history to identify changes made to the master geographic database 102.

A server 104 includes server applications 106 that may be stored on one or more hard drive(s) or other media operated by the server 104 and loaded into a memory of the server 104 to run. The server applications 106 include a map data application 108, a communications application 110, an updates application 112 and a navigation application 114. The communications application 110 interfaces with a data network, such as the Internet 116, in order to receive messages from and send messages to a plurality of end users. The data network may use any suitable technology and/or protocols that are currently available, as well as technology and/or protocols that become available in the future. For example, the data network may use WAP, TCP/IP, etc. More than one protocol may be used in the data network with appropriate conversions. The data network may be part of, or connected to, the Internet. A portion of the network may include a wireless portion. The wireless portion may be implemented by any suitable form of wireless communication, including cellular, PCS, satellite, FM, radio, or technologies that may be developed in the future.

Included among the server applications 106 are the map data application 108, the communications application 110, the updates application 112 and the navigation application 114. The map data application 108 uses the geographic database 102 associated with the server 104 to provide the various different types of requested map data to the end user computing platforms. The updates application 112 uses the geographic database 102 to provide updates to the end user's copy of the geographic database (an update for the geographic database is a description of a change to previously released geographic data; the alteration is stated in terms of an existing, known geographic data set comprising the geographic database, when this alteration is processed, it results with a potentially new set of geographic data for the geographic database). The navigation application 114 uses the geographic database 102 to provide navigation-related functions and features, such as route calculation (wherein a route from an origin to a destination is determined) and route guidance (wherein detailed directions are provided for reaching a desired destination). In one embodiment, the communications application 110 interfaces with the data network in order to receive messages requesting map data, updates and/or navigation-related features and to send messages including the requested map data, updates and/or data corresponding to the navigation-related features.

Referring to FIG. 5, to obtain geographic information for the computing platform 10, the end user connects the computing platform 10 to a personal computer 118. In one embodiment, the end user uses the personal computer 118 to request and receive messages from the communications application 110. Briefly, the end user using the personal computer 118 sends a request message 120 to the geographic information provider 100 requesting geographic information. In another embodiment, the end user uses the computing platform 10 to request and receive messages from the communications application 110, wherein the messages may be sent via the personal computer 118 or directed by the computing platform 10 to the geographic information provider 100. Generally, the request message 120 identifies the end user and the computing platform 10. Additionally, the request message 120 indicates the type of geographic information requested. More details regarding the requests for geographic information will be described below in conjunction with the geographic information features of the computing platform 10.

The communication application 110 on the server 104 receives the request message 120. Additionally, the appropriate server application 106, such as the map data application 108, updates application 112 and the navigation application 114, processes the request message 120. The appropriate server application 106 retrieves the necessary information from the master geographic database 102 and prepares a data package 122 containing the data for the requested geographic information. The communication application 110 sends a message with the data package 122 to the personal computer 118 via the Internet 116. In one embodiment, the data package 122 may be encrypted. The personal computer 118 receives the message with the data package 122 and, if necessary, processes the data package to obtain the geographic information. The personal computer 118 then stores the dataset of the geographic information in associated memory. The personal computer 118 also transfers the dataset of the geographic information to the computing platform 10 that stores the data in associated memory. In another embodiment, the geographic information provider sends the data package 122 directly to the computing platform 10.

IV. Geographic Information Features of the Computing Platform

A. Obtain Map Data

Figure 6:
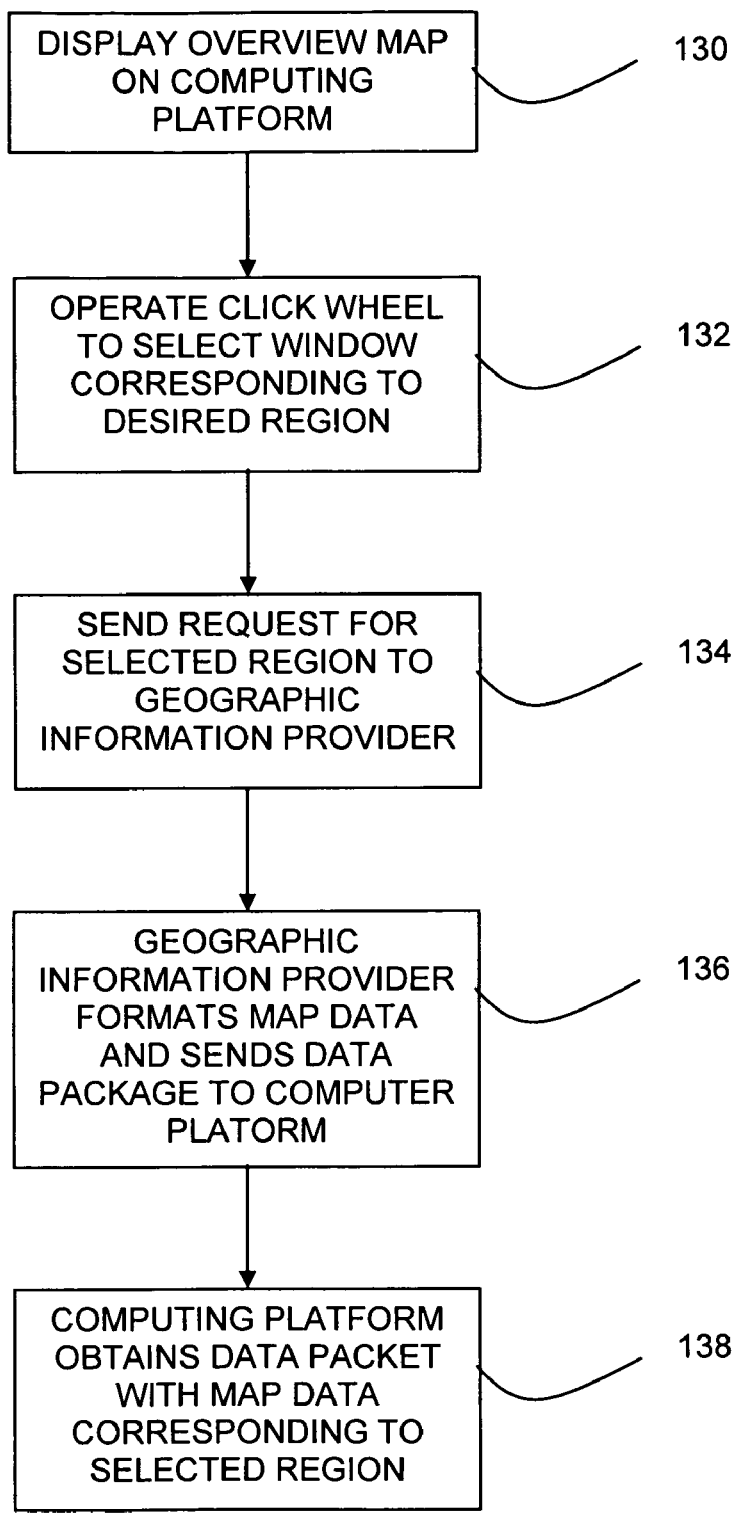
FIG. 6 is a flow chart of the steps for obtaining map data from a geographic information provider.

The computing platform 10 includes a geographic information feature that allows the end user to obtain map data for display on the computing platform 10 from the geographic information provider 100. To obtain map data, the end user operates the click wheel 42 to select appropriate menu choices to activate the obtain map data program 32. FIG. 6 illustrates a flow chart of the steps for obtaining map data from the geographic information provider 100. First at step 130, the obtain map data program 32 presents an overview map 140 on the display 44 of the computing platform 10.

Figure 7:
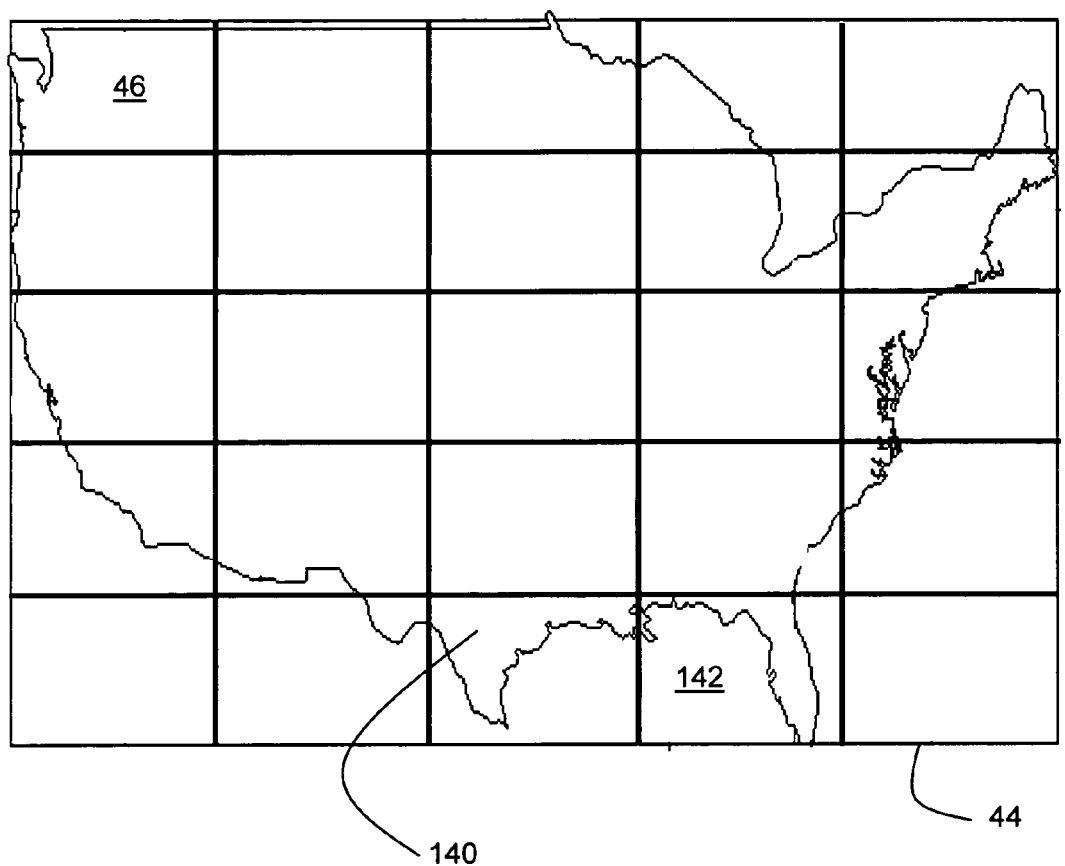
FIG. 7 shows an overview map of a geographic region illustrated on a display of the computing platform of FIG. 2.

Referring to FIG. 7, the overview map 140 illustrates the continental United States of America; although, in other embodiments, the overview map 130 may illustrate any geographic region. At step 132, the end user operates the click wheel 42 to select a geographic region that is a portion of the overview map 140. Specifically, the upper left corner window 46 of the display 44 is initially highlighted, and the end user makes clockwise moving contact with the wheel portion 48 of the click wheel 42 to highlight the next right adjacent window. Alternatively, the end user may use the next/fast-forward button 52 or the previous/rewind button 54 to highlight the next window. Once the right-most window for a row has been highlighted, the next window highlighted will be the left-most window of the row immediately below. For example, if the end user desires map data of the state of Florida, the end user makes moving contact with the wheel portion 48 of the click wheel 42 until the window 142 corresponding to the state of Florida is highlighted.

Once the desired window 142 is highlighted, the end user selects the geographic region corresponding to the highlighted window using the center button 50 of the click wheel 42. In one embodiment, the selected geographic region corresponds to the boundaries of the window 142. In other embodiments, the selected geographic region does not correspond to the boundaries of the window 142; rather, the selected geographic region is a predefined geographic region either entirely or partially located within the boundaries of the selected window 142. In a further embodiment, selecting the desired window provides a zoomed in map of the selected window 142 on the display, and the end user may similarly select one of the windows as discussed above. In yet another embodiment, the windows 46 of the display 44 conform to pre-established portions of the overview map 140. For example, the windows 46 may follow the borders of groups of states, individual states, metropolitan regions, counties, cities or any other established division. In a further embodiment, the end user may select the desired region via menus and/or entry of a name of the geographic region. In another embodiment, the end user may alternatively select the desired geographic region using an internet browser on the personal computer 118.

To obtain map data from the geographic information provider 100, the computing platform 10 sends the request message 120 for the selected region to the geographic information provider 100 at step 134. In one embodiment, the request message 120 is sent by the personal computer 118 to the geographic information provider 100. In an alternative embodiment, the request message 120 is sent by the computing platform 10. Generally, the request message 120 identifies the end user, the computing platform 10, the type of transaction (map data request) and the selected geographic region. The request message 120 may include identification codes for the end user, the computing platform, the type of transaction and the selected geographic region.

In one embodiment, the communication application 110 on the server 104 of the geographic information provider 100 receives the request message 120. The communication application 110 may also verify the identity of the end user and provide necessary permissions and/or billing for the requested map data transaction. Because the request message 120 identifies the type of transaction as a map data request, the server initiates the map data application 108. The map data application 108 determines the type of end user computing platform, such as the iPod Photo™ digital media player. The map data application 108 then retrieves the necessary information from the master geographic database 102 and performs any processing and/or formatting necessary to provide the map data representing the requested geographic region to the identified type of computing platform 100 at step 136.

Formatting of the map data may be necessary because the geographic information provider 100 supplies map data to different types of computing platforms 10. For example, the map data may be formatted for a computing platform with a display having a five by five array of windows as shown in FIG. 2; the map data may be formatted for a different computing platform with display having a three by three array of windows, and so on. In one embodiment, the formatting step comprises preparing arrays of map images that when viewed on the display 44 of the computing platform 10 provides a map of the requested geographic region and zoomed in maps of portions of the selected region.

In one embodiment, the map data application 108 generates an original map image depicting an original map of the requested geographic region at an original scale. To generate the original map image, the map data application 108 accesses cartographic data representing geographic features in the requested geographic region from the geographic database 102. For example, if the requested geographic region is the state of Florida, the map data application 108 accesses the cartographic data representing the geographic features in the state of Florida. In one embodiment, the map data application 108 uses a map display tool to generate the original map image. A map display tool and methods for generating the map display are disclosed in U.S. Pat. No. 6,092,076, the entire disclosure of which is incorporated by reference herein. (The methods disclosed in the aforementioned patent represent only some of the ways that map displays and map images can be generated and the claimed subject matter herein is not limited to any particular method of generated map display images. Any suitable map display method now known or developed in the future may be employed.)

Once the original map image has been generated, the map data application 108 formats the geographic information for the specified computing platform. In one embodiment, the original map image is divided into a set of separate original-zoom-level images to be displayed in the windows of the display of the specified computing platform. For example, if the computing platform has a display comprising a five-by-five array of windows, the original map image is divided into a five-by-five array of (twenty-five) original-zoom-level images by approximately equally spacing four dividing lines along the vertical axis and four dividing lines along the horizontal axis of the original map image. When the original-zoom-level map images are displayed together, they illustrate the original map.

For each of the original-zoom-level map images, the map data application 108 generates a second map image depicting a zoom-in-once map of the portion of the geographic region depicted in the corresponding original-zoom-level map image. The scale of the zoom-in-once map is larger than the original scale of the original map and provides additional details of the geographic features within the portion of the geographic region. The map data application 108 accesses cartographic data from the geographic database 102 and uses the map display tool to generate the second map image. Once the second map image has been generated, the map data application 108 formats the image for the specified computing platform. In one embodiment, the second map image is divided into a set of separate zoom-in-once images to be displayed in the windows of the display of the specified computing platform. For example, if the computing platform has a display comprising a five-by-five array of windows, the second map image is divided into a five-by-five array of zoom-in-once images by approximately equally spacing four dividing lines along the vertical axis and four dividing lines along the horizontal axis of the image. When the zoom-in-once map images are displayed together, they illustrate the zoom-in-once map.

For each of the zoom-in-once map images, the map data application 108 generates a zoom-in-twice image depicting a zoom-in-twice map of the portion of the geographic region depicted in the corresponding zoom-in-once map image. The scale of the zoom-in-twice map is larger than the scale of the zoom-in-once map and provides additional details of the geographic features within the portion of the geographic region. The map data application 108 accesses cartographic data from the geographic database 102 and uses the map display tool to generate the zoom-in-twice map image. In one embodiment, the zoom-in-twice map image may be divided into an array of separate map images as discussed above. Furthermore, the map data application 108 may follow this process for additional sets of images providing additional zoom levels with larger scales and additional details of the geographic features.

Figure 8:
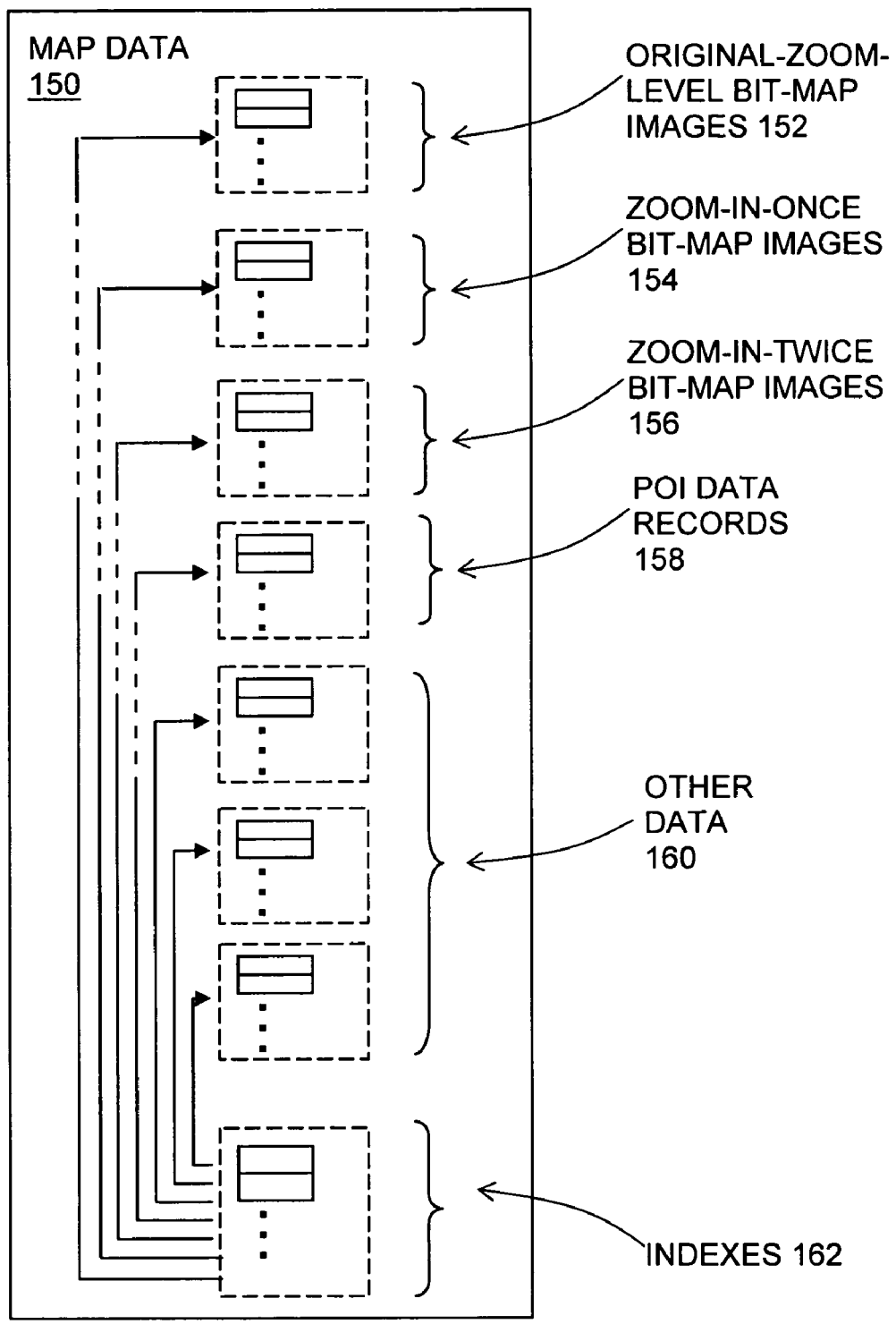
FIG. 8 is a block diagram of map data for a geographic region.

FIG. 8 illustrates one embodiment of the map data 150 for the requested geographic region. The map data 150 contains data that represents some of the physical geographic features in the geographic region. In the embodiment of FIG. 8, the map data 150 that represents the geographic region contains a plurality of original-zoom-level bit-map images 152. The file format for the images 152 may be any appropriate format known to one skilled in the art. The bit-map images 152 when assembled on the display 44 provide an image of a map representing the requested geographic region, such as the state of Florida. For the computing platform whose display 44 comprises the five-by-five array of windows 46, the original-zoom-level bit-map images 152 comprise twenty-five images. When these twenty-five images are displayed in their appropriate window, the display provides a map of the requested geographic region. If the computing platform has a display comprising the three-by-three array of windows, the original-zoom-level bit-map images 152 comprise nine images that similarly provide a map of the requested geographic region. Each original-zoom-level bit-map image 152 includes an image ID by which the image can be identified in the map data 150. Each image 152 also includes a window ID indicating the window 46 on the display 44 in which the image will be displayed.

In the embodiment of FIG. 8, the map data 150 that represents the geographic region also contains a plurality of zoom-in-once bit-map images 154. The zoom-in-once bit-map images 154 when properly assembled on the display 44 provide an image of a zoom-in-once map for each of the windows of the prior map illustrating the requested geographic region. For the computing platform whose display 44 comprises the five-by-five array of windows 46, the zoom-in-once bit-map images 154 comprise six hundred twenty-five images or twenty-five zoomed in images (zoom-in-once images 154) for each of the twenty-five original-zoom-level images 152. If the computing platform has a display comprising the three-by-three array of windows, the zoom-in-once bit-map images comprise eighty-one images or nine zoomed in images (zoom-in-once images 154) for each of the nine original-zoom-level images 144. Each zoom-in-once bit-map image 154 includes an image ID by which the image can be identified in the map data 150. Each image 154 also includes a window ID indicating the window 46 on the display 44 in which the image will be displayed.

The map data 150 that represents the requested geographic region also contains a plurality of zoom-in-twice bit-map images 156. The bit-map images 156 provide an image of a zoom-in-twice map for each of the windows of the prior zoom-in-once map. Each zoom-in-twice bit-map image 156 includes an image ID by which the image can be identified in the map data 150. In alternative embodiments, additional levels of zoom images may be provided with the map data 150.

The map data 150 also includes point of interest data 158. For example, the point of interest data 158 may include point of interest records comprising a type (e.g., the type of point of interest, such as restaurant, hotel, city hall, police station, historical marker, ATM, golf course, etc.), location of the point of interest, a phone number, hours of operation, etc. Each point of interest has a unique physical location and each of the locations can be identified as being located within the region represented by one of the zoom-in-twice bit-map images 156. In an alternative embodiment, the location of each of the points of interest may be identified by its two dimensional (or three dimensional) geographic coordinates, (i.e., latitude, longitude, and optionally altitude).

The map data 150 may also include other kinds of data 160. The other kinds of data 160 may represent other kinds of geographic features or anything else. The other kinds of data 160 may include historic and/or tourist information. The other kinds of data 160 may also include images of geographic features. For example, the images may be digital photographic images of portions of road segments, intersections and points of interest. The map data 150 also includes indexes 162. The indexes 162 may include various types of indexes that relate the different types of data to each other or that relate to other aspects of the data contained in the map data 150.

Referring to FIG. 6, once the appropriate information is retrieved from the master geographic database 102, processed and formatted for the identified computing platform 10, the geographic information provider 100 prepares a data package 122 containing the data for the requested map data. The data package 122 includes a header indicating a name of the geographic region and other information. The communication application 110 then sends a message with the data package 122 to the computing platform 10 at step 136 of FIG. 6.

At step 138, the computing platform obtains the data package 122 with the map data corresponding to the requested geographic region. In one embodiment, the personal computer 118 first receives the data package 122 and transfers it to the computing platform 10. Alternatively, the computing platform 10 directly receives the data package 122. The computing platform 10 stores the map data in associated memory. Once the requested map data has been obtained from the geographic information provider 100, the map data can be viewed on the display 44 of the computing platform 10.

B. Display Map Data

Figure 9:
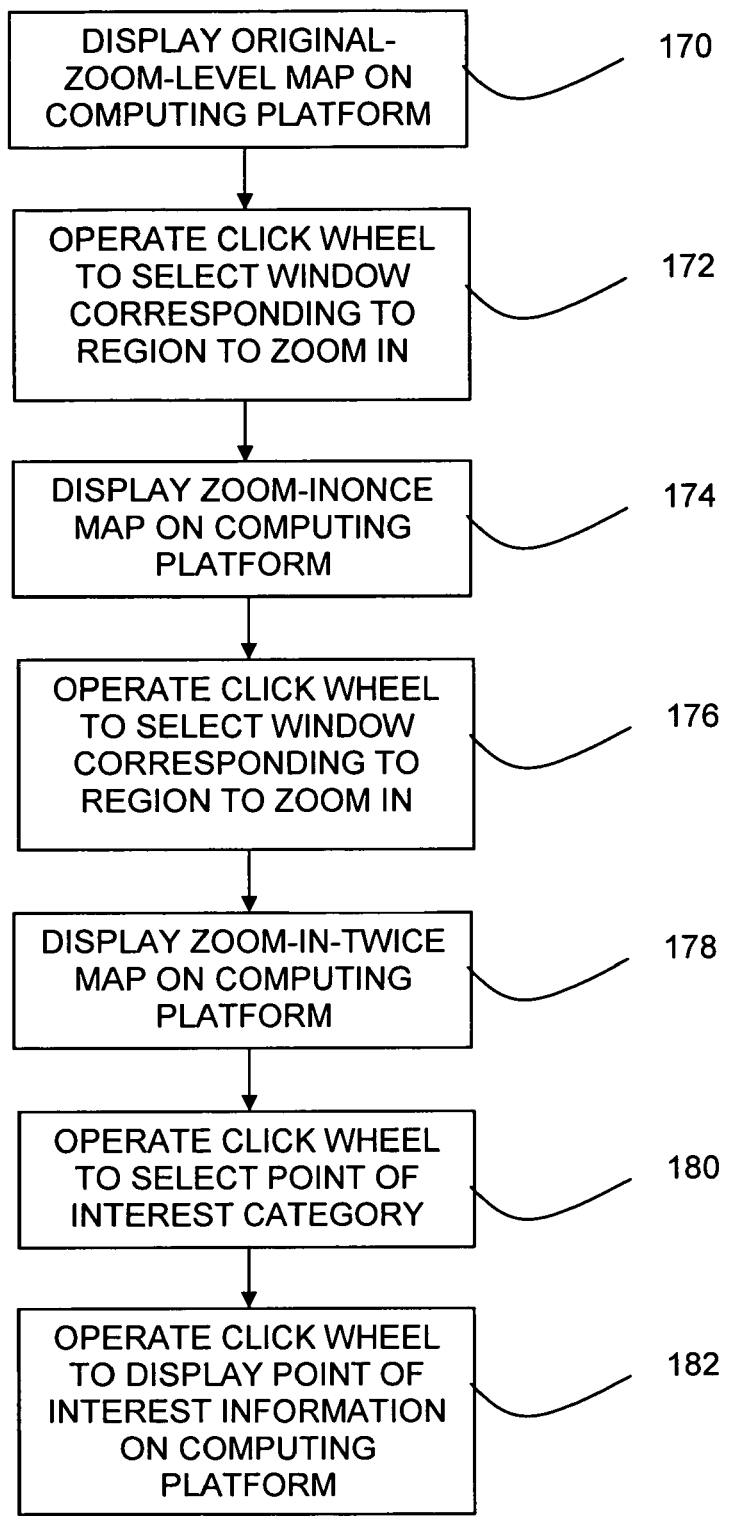
FIG. 9 is a flow chart of the steps for displaying map data on the computing platform.
Figure 10:
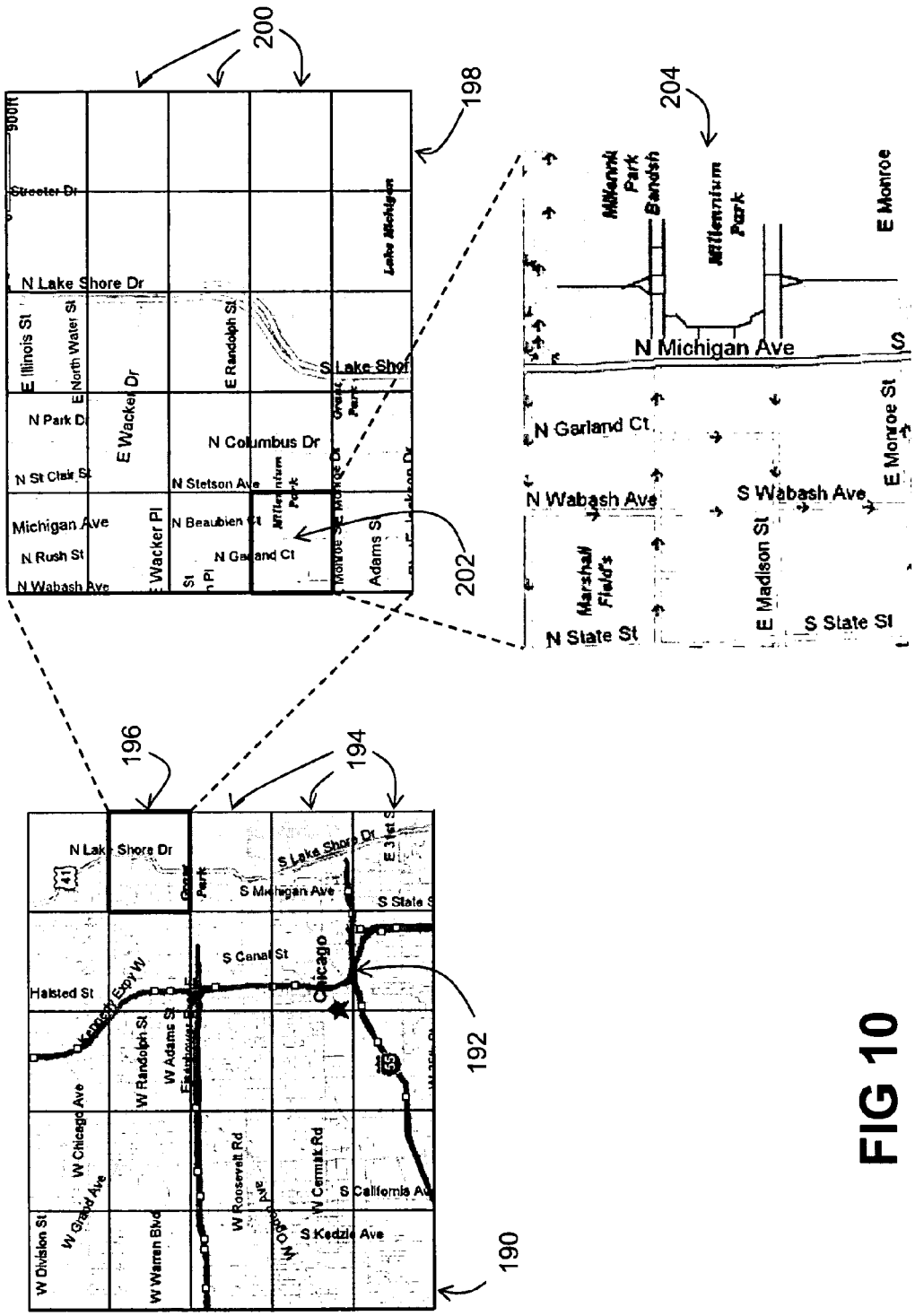
FIG. 10 shows a map of a geographic region and zoomed in maps of portions of the geographic region displayed on the computing platform.

The computing platform 10 includes a geographic information feature that allows the end user to view map data on the display 44 of the computing platform 10. To display map data on the display 44 of the computing platform, the end user operates the click wheel 42 to select appropriate menu choices to activate the map display program 34. Additionally, the end user operates the click wheel 42 to select one of the available geographic regions for which map data has been obtained. FIG. 9 illustrates a flow chart of the steps for displaying map data. First at step 170, the map display program 34 presents a map 190 representing the selected geographic region 192 on the display 44 of the computing platform 10. The map 190 comprises an array of bit-map images at an initial scale or zoom level, original-zoom-level, obtained from memory associated with the computing platform 10. For the embodiment shown in FIG. 10, the map 190 comprises twenty-five original-zoom-level bit-map images 194 arranged in the windows 46 of the display 44. The images 194 provide a map of Chicago at a first scale with an initial level of detail.

At step 172, the end user operates the click wheel 42 to select a portion of the map 190 to zoom into greater detail. The end user selects one of the windows of the map 190 in the manner discussed above. For example, if the end user desires to view a more detailed map of downtown Chicago, the end user highlights and selects window 196 corresponding to downtown Chicago. Once the end user has selected the window 196 for zooming, the map display program 34 presents a more detailed map 198 representing the portion of the geographic region 192 corresponding to the selected window 196 at step 174. The map 198 comprises an array of bit-map images at a larger, more detailed scale or zoom level, zoom-in-once images, obtained from memory associated with the computing platform 10. For the embodiment shown in FIG. 10, the map 198 comprises twenty-five zoom-in-once bit-map images 200 arranged in the windows 46 of the display 44. The images 200 arranged in the windows provide a more detailed map of downtown Chicago.

At step 176, the end user operates the click wheel 42 to select a portion of the map 198 to zoom into greater detail. For example, if the end user desires to view a more detailed map of the South Loop area of Chicago, the end user highlights and selects window 202 corresponding to the South Loop. At step 178, once the end user has selected the window 202 for zooming, the map display program 34 presents a more detailed map 204 representing the portion of the geographic region 192 corresponding to the selected window 202 at step 176. The map 204 comprises a single bit-map image 156 at a more detailed scale or zoom level (zoom-in-twice image), obtained from memory associated with the computing platform 10. For the embodiment shown in FIG. 10, the map 204 comprises a single zoom-in-twice bit-map image on the display 44. In one embodiment, the end user may use the next/fast-forward button 52 and previous/rewind button 54 to pan the map 204 to view portions not shown on the display.

Figure 11:
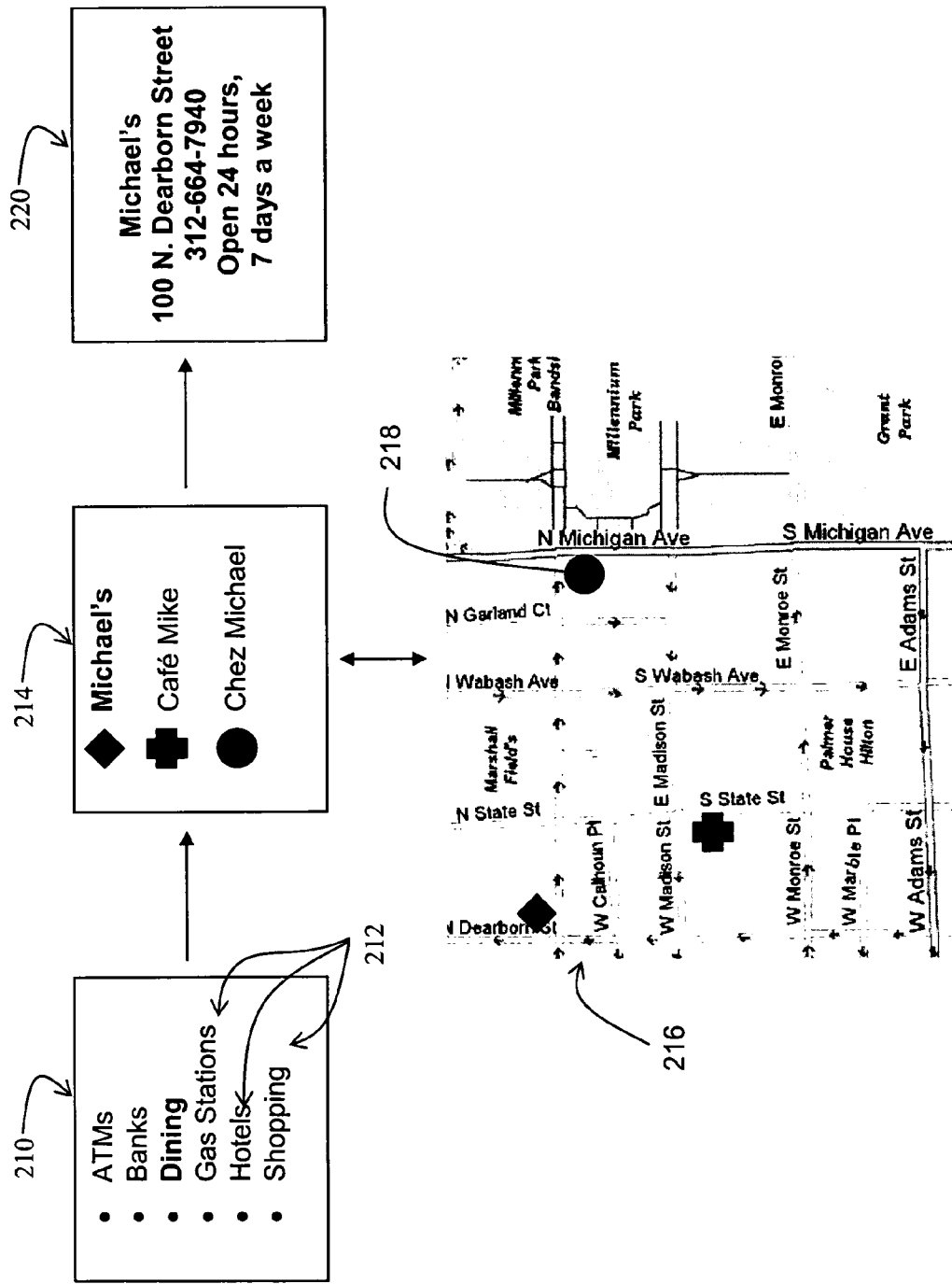
FIG. 11 shows point of interest information displayed on the computing platform.

Once the end user has zoomed to a desired zoom level or scale, the end user operates the click wheel 42 to obtain point of interest information for the geographic region displayed on the screen 44. In one embodiment, the end user presses the center button 50 of the click wheel 42 to obtain a menu 210 listing point of interest categories 212 as shown in FIG. 11. For example, the point of interest categories 212 include ATMs, banks, dining, gas stations, hotels, shopping, and so on. At step 180, the end user operates the click wheel 42 to select an appropriate point of interest category 212 from the menu 210. For example, the end user has highlighted and selected the point of interest category 212 of dining in FIG. 11. Once the end user selects one of the points of interest categories 212, the computing platform 10 displays the points of interest of the selected category that are located within the geographic region of map 204.

Referring to FIG. 11, the computing platform 10 includes two modes of display for the points of interest of the selected category. In a first mode, the points of interest are displayed as a menu 214. In a second mode, the points of interest are displayed as icons 218 on a map 216 of the geographic region. The end user may toggle between the two display modes using the click wheel 42. After viewing the available points of interest on the display 44, the end user selects one of points of interest to display information about the point of interest at step 182 of FIG. 9. For example, the end user selects Michael's on the menu 214 to provide information 220 relating to Michael's. The information 220 includes a street address, telephone number and business hours. The information 220 may also include a menu, promotional materials, images of the restaurant, handicap accessibility, number of seats, reservations suggested, parking availability, drive-through, average entrée price, cuisine type, meals served, payment method, smoking or nonsmoking, outdoor seating, and so on. After viewing the information, the end user may operate the click wheel 42 to move back to the previously displayed menu 214 and make another selection to view information pertaining to other points of interest.

C. Update Geographic Database

The computing platform 10 includes a geographic information feature that allows the end user to obtain update data from the geographic information provider 100 for a geographic database separate from the computing platform 10. Typically, the geographic database is part of a navigation system, such as a vehicle navigation system. Update data is a description of a change to previously released geographic data; the alteration is stated in terms of an existing, known geographic data set comprising the geographic database, when this alteration is processed, it results with a potentially new set of geographic data for the geographic database. To obtain update data, the end user operates the click wheel 42 to select appropriate menu choices to activate the update program 36. The update program 36 may be viewed as having two portions: an obtain update data from the geographic information provider 100 portion and a provide update data to a navigation system portion.

Figure 12:
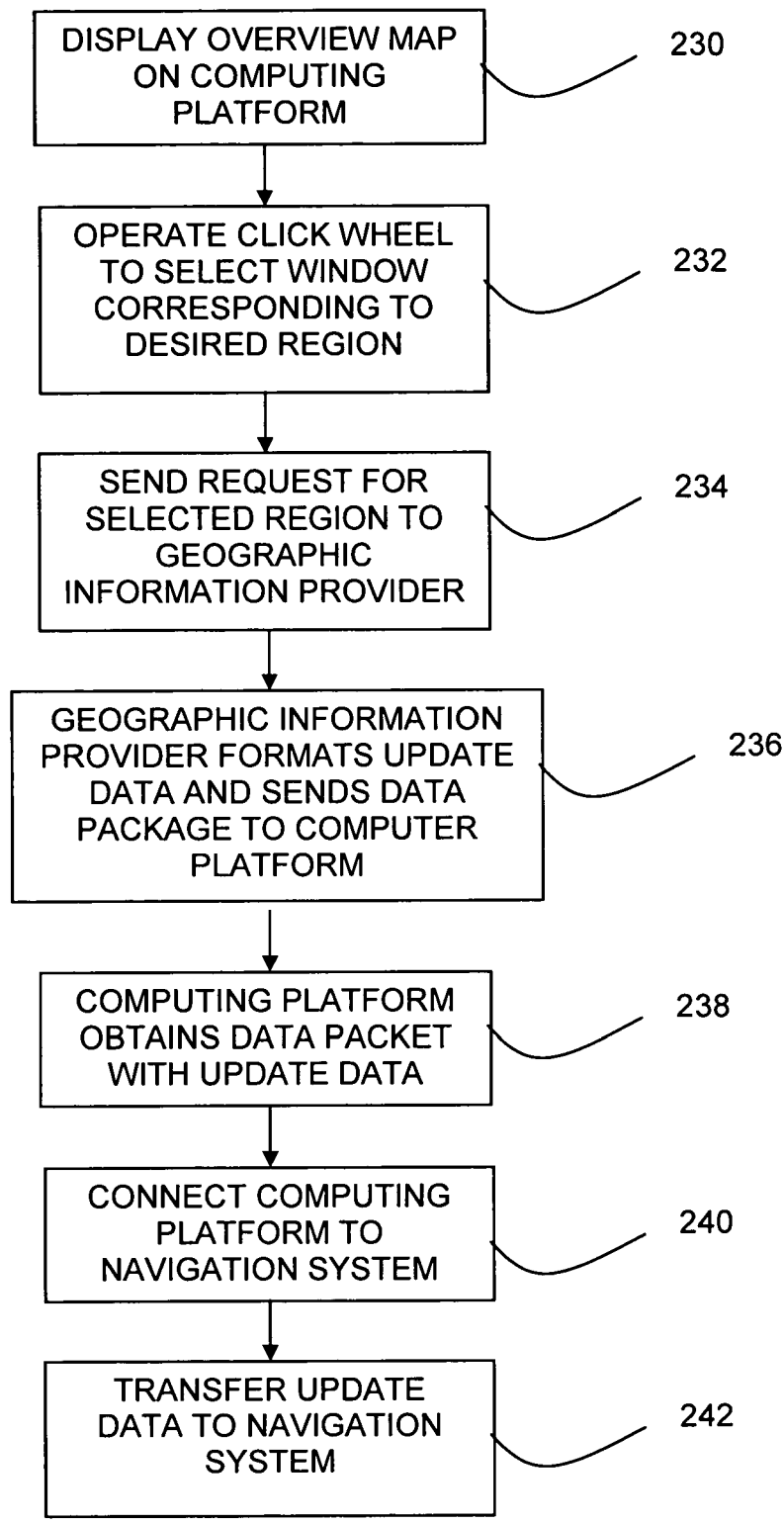
FIG. 12 is a flow chart of the steps for obtaining update data for a geographic database.
Figure 13:
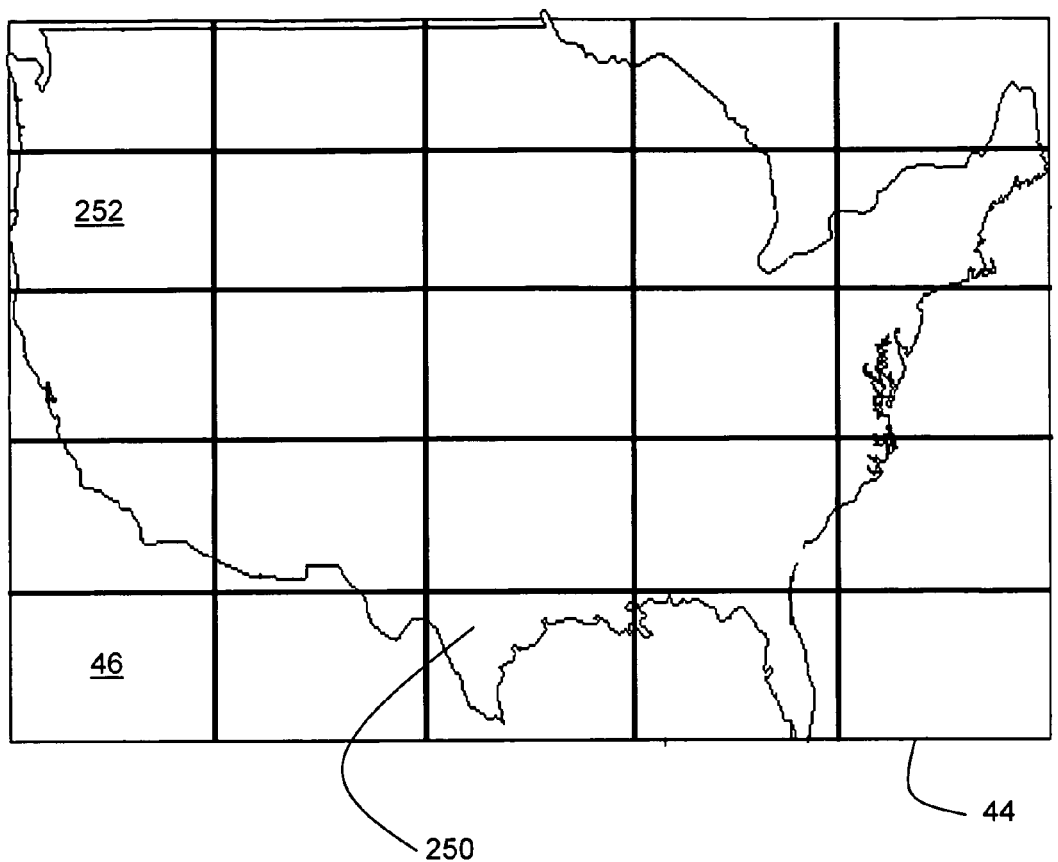
FIG. 13 shows an overview map of a geographic region illustrated on a display of the computing platform of FIG. 2.

FIG. 12 illustrates a flow chart of the steps for obtaining update data and providing the update data to the navigation system. First at step 230, the updates program 36 presents an overview map 250 on the display 44 of the computing platform 10. Referring to FIG. 13, the overview map 250 illustrates the continental United States of America; although, in other embodiments, the overview map 250 may illustrate any geographic region. At step 232, the end user operates the click wheel 42 to select a geographic region that is a portion of the overview map 250. For example, if the end user desires update data for the state of Oregon, the end user highlights and selects the window 252 corresponding to the state of Oregon. In one embodiment, the selected geographic region for the update data corresponds to the boundaries of the window 252. In other embodiments, the selected geographic region does not correspond to the boundaries of the window 252; rather, the selected geographic region is a predefined geographic region either entirely or partially located within the boundaries of the selected window 252. In a further embodiment, selecting the desired window provides a zoomed in map of the selected window 252 on the display, and the end user may similarly select one of the windows for a portion of the selected geographic region. In yet another embodiment, the windows 46 of the display 44 conform to pre-established portions of the overview map 250. For example, the windows 46 may follow the borders of groups of states, individual states, metropolitan regions, counties, cities or any other established division. In a further embodiment, the end user may select the desired region via menus and/or entry of a name of the geographic region. In another embodiment, the end user may alternatively select the desired geographic region using an internet browser on the personal computer 118.

To obtain update data from the geographic information provider 100, the computing platform 10 sends a request message 120 for the selected region to the geographic information provider 100 at step 234. In one embodiment, the request message 120 is sent by the personal computer 118 to the geographic information provider 100. In an alternative embodiment, the request message 120 is sent by the computing platform 10. Generally, the request message 120 identifies the end user, the computing platform 10, the type of transaction (update data request), the geographic database to be updated and its version number with any prior update history and the requested geographic region. The request message may include identification codes for the end user, the computing platform, the type of transaction, the geographic database and the requested geographic region.

In one embodiment, the communication application 110 on the server 104 of the geographic information provider 100 receives the request message 120. The communication application 110 may also verify the identity of the end user and provide necessary permissions and/or billing for the requested update data transaction. Because the request message 120 identifies the type of transaction as an update data request, the server initiates the update data application 112. The update data application 112 determines the type of update data necessary to bring up to date the identified geographic database. Methods for preparing and providing update data for a geographic database are disclosed in U.S. patent application Ser. No. 10/955,523, the entire disclosure of which is incorporated herein by reference.

The update data application 112 retrieves the necessary information from the master geographic database 102 and performs any processing and formatting necessary to provide the update data for the requested geographic region to the computing platform 100. Once the appropriate information for the update has been developed, the geographic information provider 100 prepares a data package 122 containing the data for the update to the identified geographic database. The data package 122 includes a header indicating a name of the geographic region 252 and other information regarding the update data. The communication application 110 then sends a message with the data package 122 to the computing platform 10 at step 236 of FIG. 12.

Figure 14:
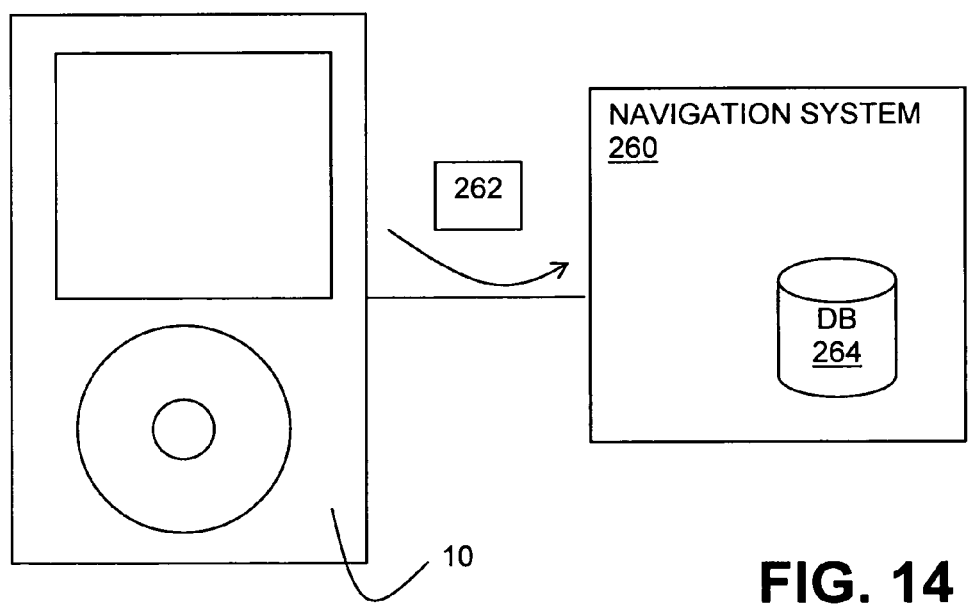
FIG. 14 is a block diagram of a system for providing update data for a geographic database of a navigation system.

At step 238, the computing platform 10 obtains the data packet 122 with the update data corresponding to the requested geographic region. The computing platform 10 stores the update data in associated memory. In one embodiment, the personal computer 118 first receives the data package 122 and transfers it to the computing platform 10. Alternatively, the computing platform 10 directly receives the data package 122. Once the requested update data has been obtained from the geographic information provider 100, the update data can be transferred to the separate navigation system. To transfer the update data, at step 240, the computing platform 10 connects to a navigation system 260 as shown in FIG. 14. The connection between the computing platform 10 and the navigation system 260 may be through a dock or by wireless communication. At step 242, the computing platform 10 transmits the update data 262 to the navigation system 260. Upon receiving the update data 262, the navigation system 260 stores the update data 262 in associated memory. The navigation system 260 then processes the update data 262 to alter its previously released geographic database 264 to provide a potentially new set of geographic data for the geographic database 264.

D. Navigation Features

The computing platform 10 includes a geographic information feature that allows the end user to obtain navigation-related features from the geographic information provider 100. The navigation-related features include route calculation (wherein a route from an origin to a destination is determined) and route guidance (wherein detailed directions are provided for reaching a desired destination). To obtain navigation-related features, the end user operates the click wheel 42 to select appropriate menu choices to activate the navigation program 38.

Figure 15:
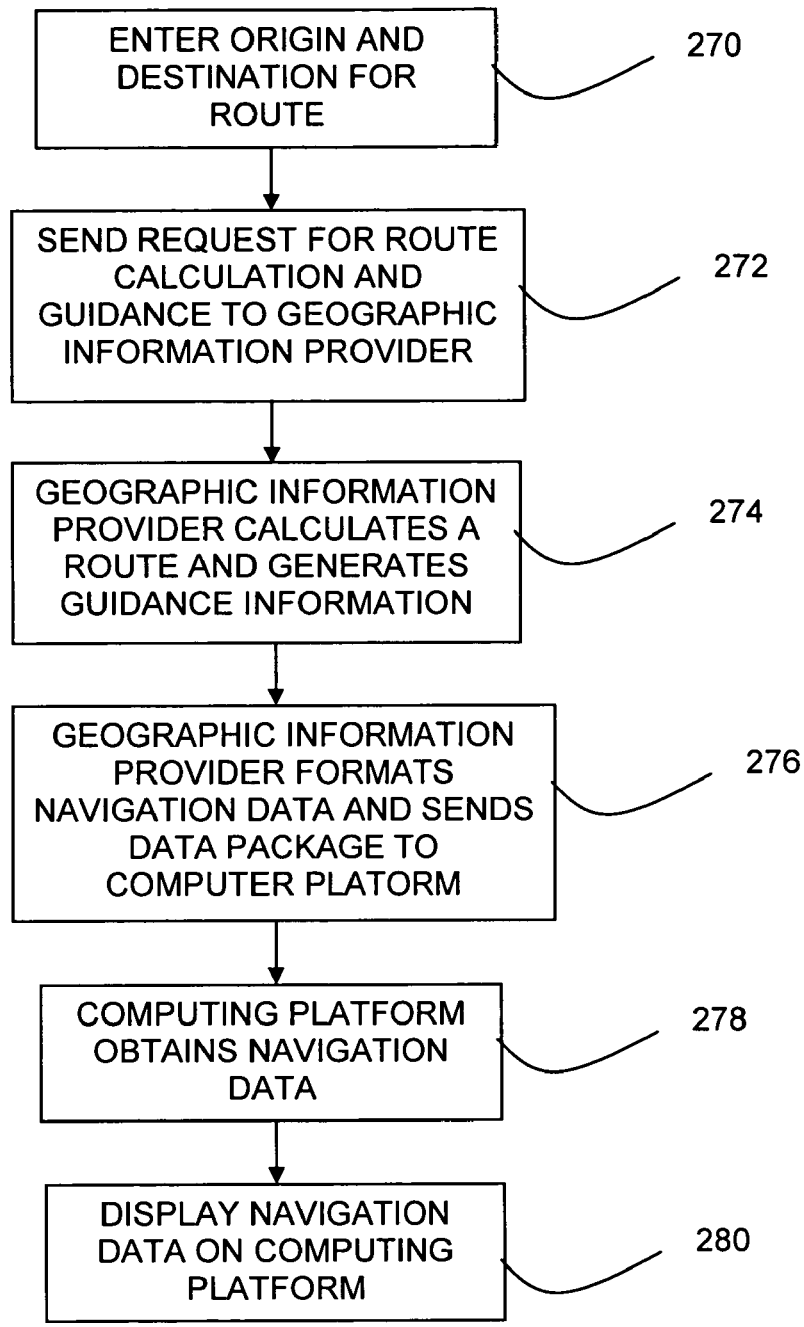
FIG. 15 is a flow chart of the steps for obtaining navigation information from a geographic information provider.

FIG. 15 illustrates a flow chart of the steps for obtaining navigation data from the geographic information provider 100. First at step 270, the end user provides an origin and a destination. In one embodiment, the end user operates the user interface 20 of the computing platform 10 to enter the desired origin and destination. In another embodiment, the end user operates the personal computer 118 to enter the desired origin and destination. In a further embodiment, the origin is provided by the positioning system 28 of the computing platform 10.

To obtain navigation data from the geographic information provider 100, the computing platform 10 sends a request message 120 with the origin and destination to the geographic information provider 100 at step 272. In one embodiment, the request message 120 is sent by the personal computer 118 to the geographic information provider 100. In an alternative embodiment, the request message 120 is sent by the computing platform 10. Generally, the request message identifies the end user, the computing platform 10, the type of transaction (navigation data request) and the origin and destination. The request message may include identification codes for the end user, the computing platform, the type of transaction and the origin and destination.

In one embodiment, the communication application 110 on the server 104 of the geographic information provider 100 receives the request message 120. The communication application 110 may also verify the identity of the end user and provide necessary permissions and/or billing for the navigation data transaction. Because the request message 120 identifies the type of transaction as a navigation data request, the server initiates the navigation application 114. The navigation application 114 determines the type of end user computing platform, such as the iPod Photo™ digital media player. The navigation application 114 then retrieves the necessary information from the master geographic database 102, calculates a route between the origin and destination and generates guidance information for following the calculated route.

The navigation application 114 determines the route for the end user to travel along the road network (68 in FIG. 3) to reach the desired destination. Given at least the identification of the origin location and the destination location, the route calculation application determines one or more solution routes between the origin and the destination. A solution route is formed of a series of connected road segments over which the end user can travel from the starting location to the destination location. When the route calculation application determines the route, it accesses the geographic database 102 and obtains data that represent road segments around and between the starting location and the destination location. The route calculation application uses the data to determine at least one valid solution route from the starting location to the destination location. Methods for calculating routes are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

The navigation application 114 of route guidance uses the output from the route calculation to provide maneuver instructions for the end user to travel to the desired destination on the calculated route. The route guidance application generates an output comprised of a series of maneuvers derived from the list of road segments provided in the output of the route calculation application. Methods for providing route guidance using geographic data are disclosed in U.S. Pat. No. 6,199,013, the entire disclosure of which is incorporated herein by reference. (The methods disclosed in the aforementioned patent represent only some of the ways that route guidance can be calculated and the claimed subject matter herein is not limited to any particular method of route guidance. Any suitable route guidance method now known or developed in the future may be employed.)

In one embodiment, the geographic information provider 100 supplies the navigation data as an array of map images similar to the map data described above in the obtain map data section. The navigation data differs from the above map data with respect to a route highlight on the solution route comprising the connected road segments over which the end user can travel from the starting location to the destination location and additional guidance information associated with the images. Similar to the map data, the geographic information provider 100 performs any formatting necessary to provide the navigation data to the identified type of computing platform 10 at step 276.

Formatting of the navigation data may be necessary because the geographic information provider 100 supplies navigation data to different types of the computing platform 10. For example, the navigation data may be formatted for a display of the computing platform having a five by five array of windows as shown in FIG. 2, the navigation data may be formatted for a display of a different computing platform having a three by three array of windows, and so on. In one embodiment, the formatting step comprises preparing arrays of bit-map images that when viewed on the display 44 of the computing platform 10 provides a map with a highlighted route from the origin to the destination and zoomed in maps of portions of the route.

Figure 16:
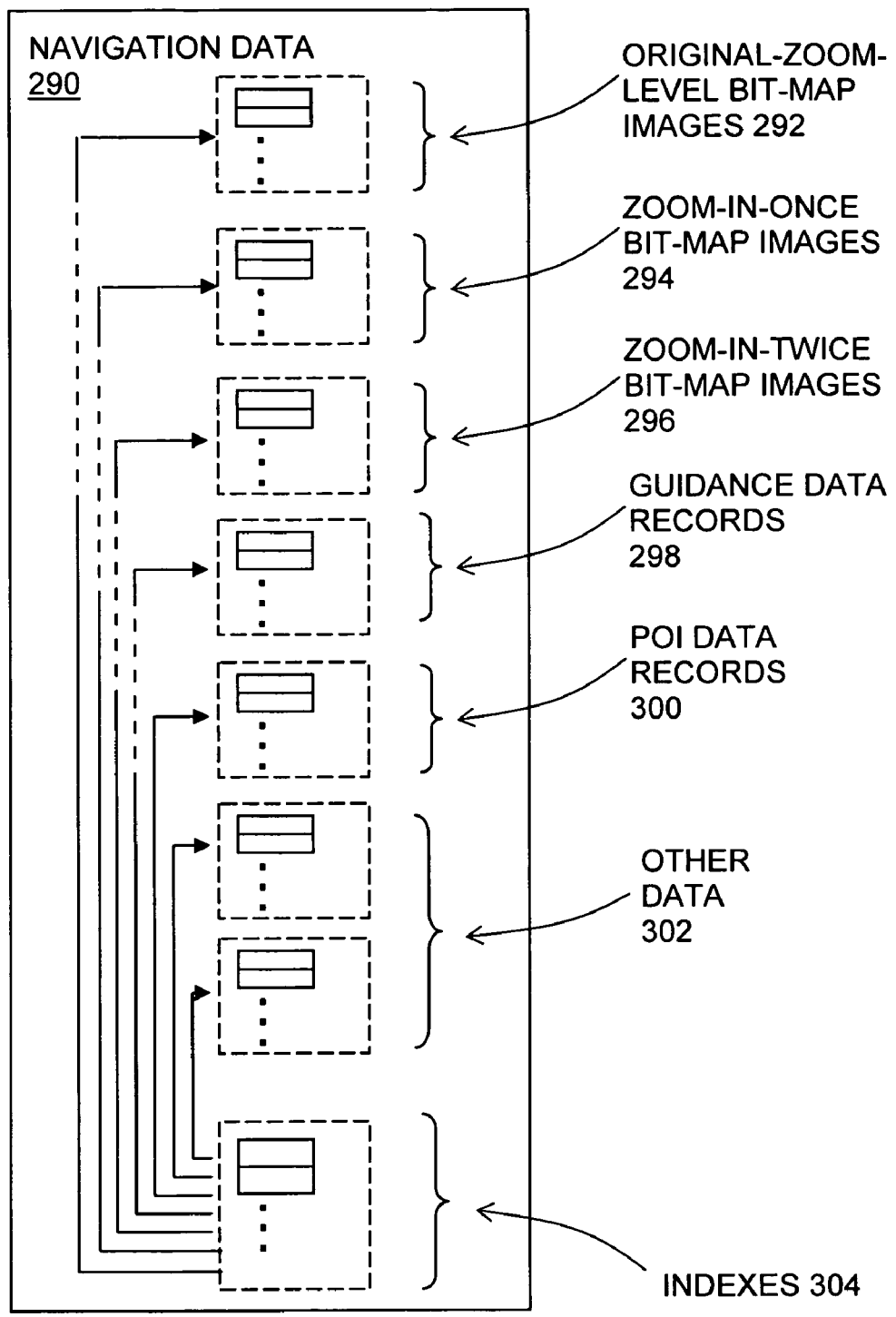
FIG. 16 is a block diagram of navigation data for a route from an origin to a destination.

FIG. 16 illustrates one embodiment of a format of the navigation data 290. The navigation data 290 contains a plurality of original-zoom-level bit-map images 292. The bit-map images 292 when assembled on the display 44 provide an image of a map representing the geographic region encompassing the origin and destination with the road segments comprising the route being highlighted. For the computing platform whose display 44 comprises the five-by-five array of windows 46, the original-zoom-level bit-map images 292 comprise twenty-five images. When these twenty-five images are displayed in their appropriate window, the display provides a map illustrating the route from the origin to the destination. Each original-zoom-level bit-map image 292 includes an image ID by which the image can be identified in the navigation data 290. Each original-zoom-level bit-map image 292 also includes a window ID indicating the window 46 on the display 44 in which the image will be displayed.

In the embodiment of FIG. 16, the navigation data 142 that represents the route from the origin to the destination also contains a plurality of zoom-in-once bit-map images 294. The zoom-in-once bit-map images 294 when properly assembled on the display 44 provides a zoomed in image of a map for each of the windows of the prior map. Each zoom-in-once bit-map image 294 includes an image ID by which the image can be identified in the map data 290. Each zoom-in-once bit-map image 294 also includes a window ID indicating the window 46 on the display 44 in which the image will be displayed.

The navigation data 290 that represents the route from the origin to the destination also contains a plurality of zoom-in-twice bit-map images 296. The bit-map images 296 provide a zoomed in image of a map representing each of the windows of the prior zoom-in-once map. Each zoom-in-twice bit-map image 296 includes an image ID by which the image can be identified in the map data 290. In alternative embodiments, additional levels of zoom images may be provided with the navigation data 290.

The navigation data 290 also includes guidance data 298. In one embodiment, the guidance data 298 comprises text describing maneuvers to be made to follow the displayed route. For example, the guidance data 298 may be "Turn left from Main Street onto First Street." Additionally, the guidance data 298 may include map images of portions of the route, especially turn locations, and these map images may include text describing maneuvers associated with the map. The guidance data 298 may also include images of intersections with guidance arrows overlaid to indicate the recommended maneuver. Furthermore, the guidance data 298 may include reference to landmarks and other geographic features at turn locations. Moreover, the guidance data may include files for presenting the guidance information as audio messages. Each guidance data record 298 can be identified as being located within the region represented by one of the zoom-in-twice bit-map images 296. Additionally, each guidance data record 298 may also be associated with a number representing a maneuver number following the route from origin to destination.

The navigation data 290 also includes point of interest data 300. For example, the point of interest data 300 may include point of interest records comprising a type (e.g., the type of point of interest, such as restaurant, hotel, city hall, police station, historical marker, ATM, golf course, etc.), location of the point of interest, a phone number, hours of operation, etc. Each point of interest has a unique physical location and each of the locations can be identified as being located within the region represented by one of the zoom-in-twice bit-map images 296. In an alternative embodiment, the location of each of the points of interest may be identified by its two dimensional (or three dimensional) geographic coordinates, (i.e., latitude, longitude, and optionally altitude).

The navigation data 290 may also include other kinds of data 302. The other kinds of data 302 may represent other kinds of geographic features or anything else. The other kinds of data 302 may include historic and/or tourist information. The other kinds of data 302 may also include images of geographic features. For example, the images may be digital photographic images of portions of road segments, intersections and points of interest. The navigation data 290 also includes indexes 304. The indexes 304 may include various types of indexes that relate the different types of data to each other or that relate to other aspects of the data contained in the navigation data 290.

Referring to FIG. 15, once the appropriate information is retrieved from the master geographic database 102, processing and formatted for the identified computing platform 10, the geographic information provider 100 prepares a data package 122 containing the data for the requested route and guidance. The data package 122 includes a header indicating a name of the origin and destination (or other name representing the requested route) and other information. The communication application 110 then sends a message with the data package 122 to the computing platform 10 at step 276 of FIG. 15.

At step 278, the computing platform obtains the data packet 122 with the navigation data. In one embodiment, the personal computer 118 first receives the data package 122 and transfers it to the computing platform. Alternatively, the computing platform 10 directly receives the data package 122. The computing platform 10 stores the navigation data in associated memory. Once the requested navigation data has been obtained from the geographic information provider 100, the navigation data can be viewed on the display 44 of the computing platform 10 at step 280 of FIG. 15. To display the navigation data on the display 44 of the computing platform, the end user operates the click wheel 42 to select appropriate menu choices to display the navigation data. Additionally, the end user operates the click wheel 42 to select one of the available routes in which navigation data has been obtained.

Figure 17:
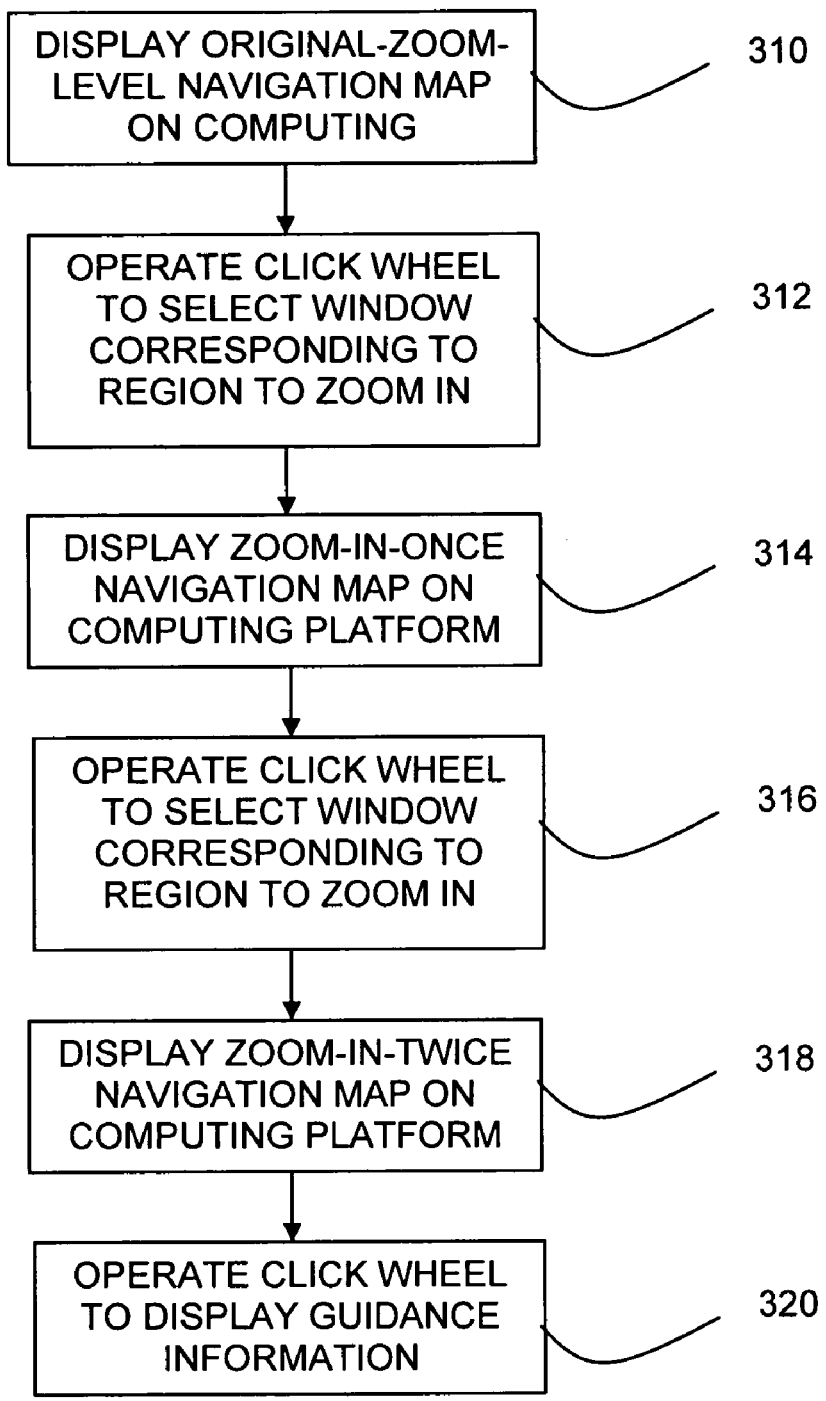
FIG. 17 is a flow chart of the steps for displaying navigation data for a route from an origin to a destination.

FIG. 17 illustrates a flow chart of the steps for displaying the navigation data. At step 310, the computing platform 10 displays a map 340 with a highlighted route 342 from an origin 344 to a destination 346. The map 340 comprises an array of bit-map images at an initial scale or zoom level, original-zoom-level images, obtained from memory associated with the computing platform 10. For the embodiment shown in FIG. 18, the map 340 comprises twenty-five original-zoom-level bit-map images 292 arranged in the windows 46 of the display 44. The images 292 provide a map of a route from the Merchandise Mart to the Field Museum in Chicago.

At step 312, the end user operates the click wheel 42 to select a portion of the map 340 to zoom into greater detail. For example, the end user highlights and selects window 348. The computing platform 10 then presents a more detailed map 350 representing the portion of the route 342 corresponding to the selected window 348 at step 314. The map 50 comprises an array of bit-map images at a more detailed scale or zoom level, zoom-in-once images 294, obtained from memory associated with the computing platform 10. For the embodiment shown in FIG. 18, the map 350 comprises twenty-five zoom-in-once bit-map images 294 arranged in the windows 46 of the display 44. The images 294 arranged in the windows provide a more detailed map of the selected portion of the route.

At step 316, the end user operates the click wheel 42 to select a portion of the map 350 to zoom into greater detail. For example, the end user highlights window 352 and selects the portion of the route 342 corresponding to the highlighted window 352. At step 318, the computing platform 10 presents a more detailed map 354 representing the portion of the route 342 corresponding to the selected window 352. The map 354 comprises a single bit-map image 296 at a more detailed scale or zoom level, zoom-in-twice image 296, obtained from memory associated with the computing platform 10. For the embodiment shown in FIG. 18, the map 354 shows the intersection of East Wacker Drive and Lake Shore Drive.

Figure 18:
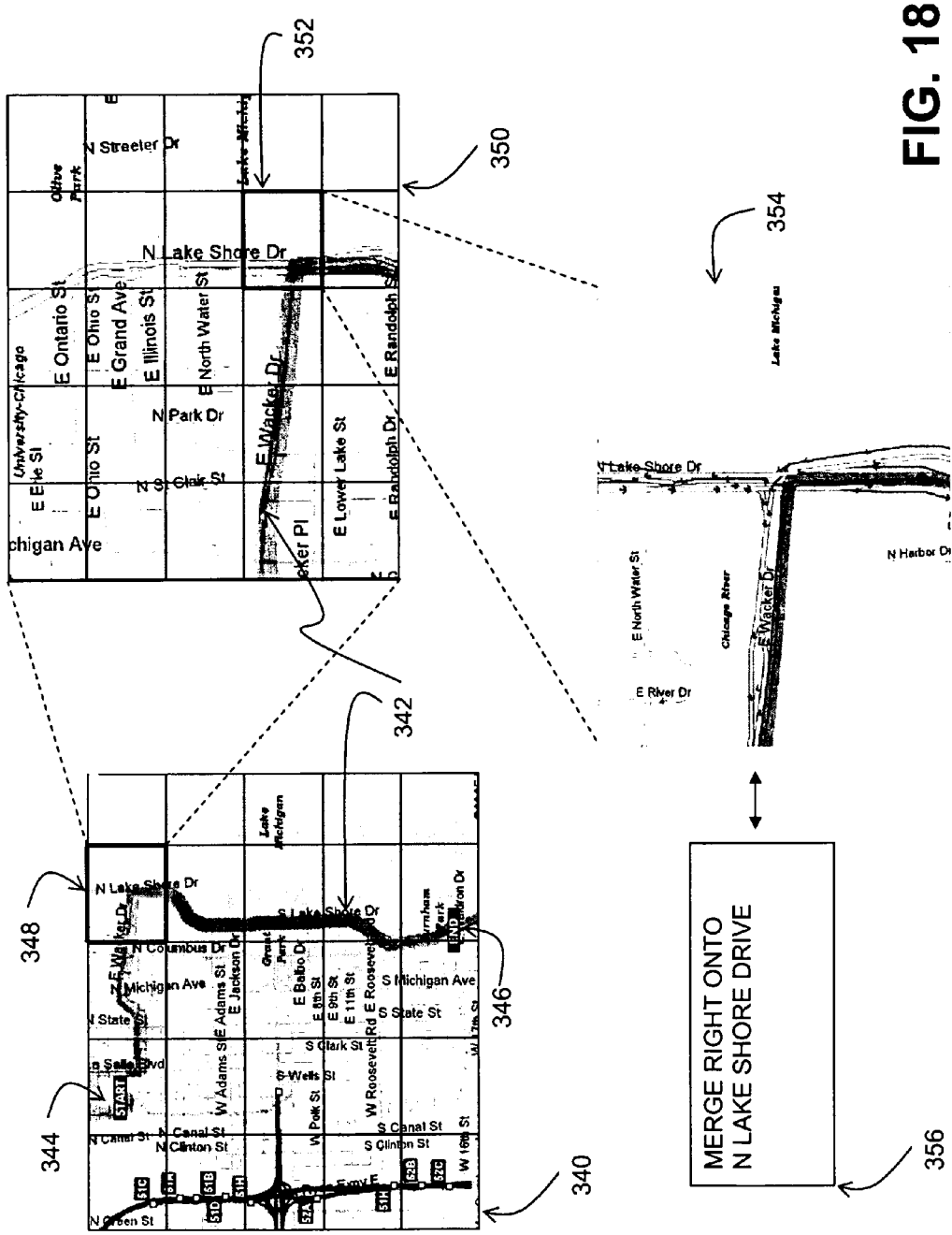
FIG. 18 shows a map of a route from an origin to a destination and zoomed in maps of portions of the route.

Once the end user has zoomed to a desired zoom level or scale, the end user operates the click wheel 42 to obtain guidance information for the portion of the route 342 displayed on the screen 44 at step 320. In one embodiment, the end user presses the center button 50 of the click wheel 42 to obtain a text guidance message 356 as shown in FIG. 18. For example, the computing platform 10 provides the text guidance message of "Merge right onto North Lake Shore Drive." In other embodiments, the end user may obtain voice guidance messages and/or images of intersections with guidance arrows. Furthermore, the end user may operate the user interface 20 to obtain point of interest information for the geographic region corresponding to the displayed map 344 in the manner similar as discussed above.

Figure 19:
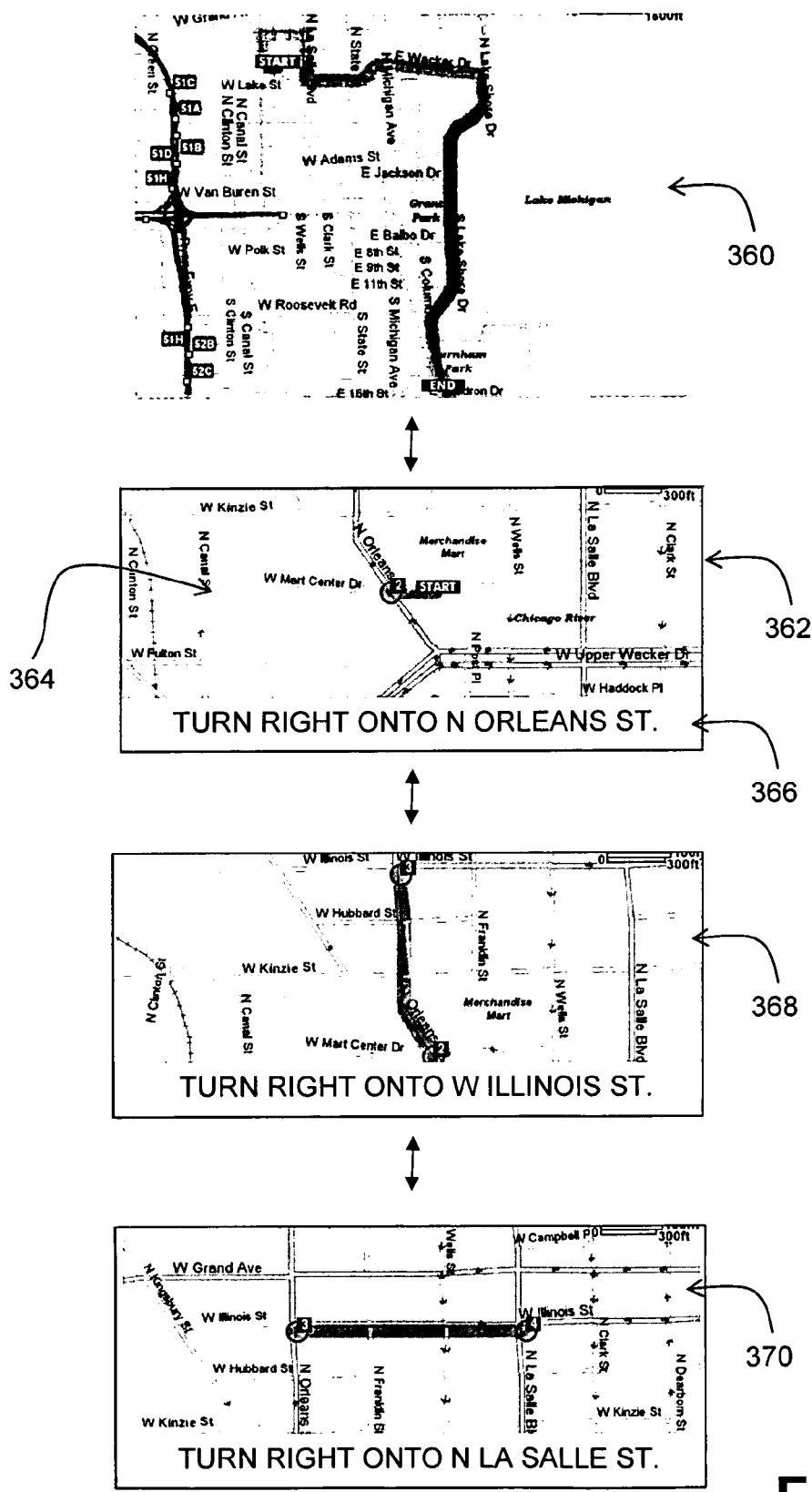
FIG. 19 shows a map of a route from an origin to a destination and zoomed in maps of portions of the route.

FIG. 19 illustrates an alternative embodiment for displaying the navigation data. The computing platform 10 initially displays an overview map 360 encompassing the origin, destination and all of the road segments of the route. After viewing the overview map 360, the end user may select an option to view a map 362 corresponding to a first maneuver on the route. The map 362 includes a map portion 364 and a guidance text portion 366. The map portion 364 illustrates a highlighted portion of the route corresponding to the necessary maneuver to follow the route. The guidance portion 366 provides a textual description for following the necessary maneuver. Maps for the other maneuvers of the route may also be consecutively displayed. For example, FIG. 19 illustrates a map 368 for the second maneuver and a map 370 for the third maneuver.

It is intended that the foregoing detailed description be regarded as illustrative rather than limiting and that it is understood that the following claims including all equivalents are intended to define the scope of the invention. The claims should not be read as limited to the described order or elements unless stated to that effect. All embodiments that come within the scope and spirit of the following claims and equivalents thereto are claimed as the invention.

We claim:

1. A method of providing geographic information for display on a computing device, the method comprising:
    providing a plurality of first map images, each of said first map images depicts a map of a portion of a geographic region, wherein said first map images when displayed together illustrate a first map of said geographic region at a first scale;
    providing a plurality of zoom-in map images for each of said first map images, wherein said zoom-in map images when displayed together provide a zoom-in map of said portion of said geographic region depicted by said first map image, said zoom-in map having a larger scale than said first scale, wherein each of the plurality of zoom-in map images is associated with a window identification value that identifies an arrangement of the plurality of zoom-in map images;
    selecting, using a click wheel user interface, one of said zoom-in map images to identify a search area for obtaining restaurant information, wherein said search area is defined by said boundaries of said selected zoom-in map image, wherein said boundaries of said selected zoom-in map image are not administrative boundaries;
    after selecting the one of the zoom-in map images, providing information regarding a plurality of restaurants located in the search area corresponding to said portion of said geographic region represented by said selected zoom-in map image, wherein said information includes at least one selected from the group consisting of: street address, business hours, telephone number, menu, images of restaurant, number of seats, parking availability, average price, cuisine type, meals served, payment method, drive-through available, reservations suggested, number of seats, handicap accessibility, promotional materials and outdoor seating.

2. The method of claim 1 further comprising:
    displaying each said first map images in one of a plurality of windows on a display to provide said first map of said geographic region.

3. The method of claim 2 further comprising:
    selecting one of first map images; and
    displaying said plurality of zoom-in map images corresponding to said selected first map image to illustrate said zoom-in map.

4. The method of claim 1 wherein said first map of said geographic region including a route highlight from an origin to a destination.

5. A method of providing geographic information for display on a computing device, the method comprising:
    providing a plurality of first map images, each of said first map images depicts a map of a portion of a geographic region, wherein said first map images when displayed together illustrate a first map of said geographic region at a first scale;
    providing a predetermined number of first zoom-in map images for each of said first map images, wherein said first zoom-in map images when displayed together provide a zoom-in map of said portion of said geographic region depicted by said first map image, said zoom-in map having a larger scale than said first scale, wherein each of the first zoom-in map images is associated with a window identification value that identifies an arrangement of the plurality of zoom-in map images;
    providing a second-zoom-in map image for each of the predetermined number of zoom-in map images;
    selecting one of said second-zoom-in map images to identify a search area for obtaining point of interest information, wherein said search area is defined by said boundaries of said selected second-zoom-in map image, wherein said boundaries of said selected second-zoom-in map image are not administrative boundaries; and
    after selecting the one of the zoom-in map images, providing information regarding a plurality of points of interest located in the search area corresponding to said portion of said geographic region represented by said selected zoom-in map image.

6. The method of claim 5, wherein the one of said second-zoom-in map images is selected via a click wheel user interface of the computing device.

7. A method of providing geographic information for display on a computing device, the method comprising:
    providing a plurality of first map images, each of said first map images depicts a map of a portion of a geographic region, wherein said first map images when displayed together illustrate a first map of said geographic region at a first scale;
    providing a predetermined number of first zoom-in map images for each of said first map images, wherein said first zoom-in map images when displayed together provide a zoom-in map of said portion of said geographic region depicted by said first map image, said zoom-in map having a larger scale than said first scale;
    providing a second-zoom-in map image for each of the predetermined number of zoom-in map images;
    selecting, via a click wheel user interface of the computing device, one of said second-zoom-in map images to identify a search area for obtaining point of interest information, wherein said search area is defined by said boundaries of said selected second-zoom-in map image, wherein said boundaries of said selected second-zoom-in map image are not administrative boundaries; and
    after selecting the one of the zoom-in map images, providing information regarding a plurality of points of interest located in the search area corresponding to said portion of said geographic region represented by said selected zoom-in map image.

* * * * *